(12) United States Patent
Witzens

(10) Patent No.: US 9,088,371 B2
(45) Date of Patent: Jul. 21, 2015

(54) WDM TELECOMMUNICATIONS LINK WITH COHERENT DETECTION AND OPTICAL FREQUENCY COMB SOURCES

(75) Inventor: Jeremy Witzens, Cologne (DE)

(73) Assignee: RWTH Aachen, Aachen (DE)

( * ) Notice: Subject to any disclaimer, the term of this patent is extended or adjusted under 35 U.S.C. 154(b) by 30 days.

(21) Appl. No.: 14/114,872

(22) PCT Filed: Apr. 27, 2012

(86) PCT No.: PCT/EP2012/057829
§ 371 (c)(1),
(2), (4) Date: Oct. 30, 2013

(87) PCT Pub. No.: WO2012/150197
PCT Pub. Date: Nov. 8, 2012

(65) Prior Publication Data
US 2014/0064734 A1  Mar. 6, 2014

Related U.S. Application Data

(60) Provisional application No. 61/481,159, filed on Apr. 30, 2011.

(51) Int. Cl.
*H04B 10/61*    (2013.01)
*H04B 10/64*    (2013.01)
*H04J 14/00*    (2006.01)
*H04J 14/02*    (2006.01)

(52) U.S. Cl.
CPC ............ *H04B 10/6164* (2013.01); *H04B 10/64* (2013.01); *H04J 14/002* (2013.01); *H04J 14/02* (2013.01)

(58) Field of Classification Search
None
See application file for complete search history.

(56) References Cited

U.S. PATENT DOCUMENTS 7,613,369 B2    11/2009 Witzens et al.

FOREIGN PATENT DOCUMENTS

| GB | 2 250 394 A | 6/1992 |
|---|---|---|
| WO | WO 2008/128202 A1 | 10/2008 |
| WO | WO 2012/049271 A1 | 4/2012 |

OTHER PUBLICATIONS

Kaiser, B., et al., "Monolithic 40-GHz Mode-Locked MQW DBR Lasers for High-Speed Optical Communication Systems", IEEE Journal of Selected Topics in Quantum Electronics, Jan./Feb. 2007, pp. 125-135, vol. 13, No. 1.

(Continued)

*Primary Examiner* — Darren E Wolf
(74) *Attorney, Agent, or Firm* — McCarter & English, LLP

(57) ABSTRACT

An optical data link has a transmitter and a receiver with coherent detection at the receiver and more than one optical carrier frequency. The optical carrier frequencies are generated by a frequency comb source in both the transmitter and the receiver. The frequency comb sources generate frequency combs that have frequency components and a free spectral range. The optical carrier frequencies transport more than one optical channel. Either at least one frequency component or the free spectral range of the optical comb generated at the receiver is locked to the comb generated at the transmitter by an optical phase locked loop, or an electrical phase locked loop or a feed-forward carrier recovery generates an intermediate frequency carrier reference that is routed to more than one channel to demodulate the data.

18 Claims, 7 Drawing Sheets

(56) References Cited

OTHER PUBLICATIONS

Akrout, A., et al., "Separate Error-Free Transmission of Eight Channels at 10 Gb/s Using Comb Generation in a Quantum-Dash-Based Mode-Locked Laser", IEEE Photonics Technology Letters, Dec. 1, 2009, pp. 1746-1748, No. 23, vol. 21.

Del'Haye, P., et al., "Optical Frequency Comb Generation From a Monolithic Microresonator", Nature, Dec. 2007, pp. 1214-1217, vol. 450, Nature Publishing Group.

Del'Haye, P., et al., "Full Stabilization of a Microresonator-Based Optical Frequency Comb", Phys. Rev. Lett. 101, Aug. 1, 2008, pp. 053903 1-053903 4.

Ip, E., et al., "Coherent detection in optical fiber systems", Optics Express, Jan. 21, 2008, pp. 753-791, vol. 16, No. 2.

Ip, E., et al., "Feedforward Carrier Recovery for Coherent Optical Communications", Journal of Lightwave Technology, Sep. 2007, pp. 2675-2692, vol. 25, No. 9.

Jeong, S.H., et al., "Compact optical 90° hybrid employing a tapered 2×4 MMI coupler serially connected by a 2×2 MMI coupler", Optics Express, Mar. 1, 2010, pp. 4275-4288, vol. 18, No. 5, Optical Society of America.

Liang, W., et al., "Coherent combining of the output of two semiconductor lasers using optical phase-lock loops", Optics Letters, Feb. 15, 2007, pp. 370-372, vol. 32, No. 4, Optical Society of America.

Narasimha, A., et al., "An ultra low power CMOS photonics technology platform for H/S optoelectronic transceivers at less than $1 per Gbps", Optical Fiber Communication, © 2010 Optical Society of America.

Xu, Q., et al., "12.5 Gbit/s carrier injection-based silicon micro-ring silicon modulators", Optics Express, Jan. 22, 2007, pp. 430-436, vol. 15, No. 2, Optical Society of America.

Padmaraju, K., et al., "DPSK Modulation Using a Microring Modulator", Laser Science to Photonics Applications, © 2011 Optical Society of America.

Huang, Q., "Flat-top passband filter based on parallel-coupled double microring resonators in silicon", Photonics and Optoelectronics Meetings (POEM) 2009: Optoelectronic Devices and Integration, vol. 7516. © 2009 SPIE.

Kato, T., et al., "Bessel-Thompson Filter Using Double-Series-Coupled Microring Resonator", Journal of Lightwave Technology, Nov. 15, 2008, pp. 3694-3698, vol. 26, No. 22.

Shen, P., et al., "Millimetre Wave Generation Using an Optical Comb Generator with Optical Phase-Locked Loops", 2002 International Topical Meeting on Microwave Photonics, Technical Digest, 2002, pp. 101-104.

Bhattacharya, M., et al., "Optical Comb Generation for DWDM Applications using Multiple Optoelectronic Phase Locked Loops", IETE Journal of Research, Sep.-Oct. 2004, pp. 331-335, vol. 50. No. 5.

International Search Report and Written Opinion of the International Searching Authority for International Application No. PCT/EP2012/057829, mailed Oct. 5, 2012.

WDM TELECOMMUNICATIONS LINK WITH COHERENT DETECTION AND OPTICAL FREQUENCY COMB SOURCES

CROSS-REFERENCE TO RELATED APPLICATIONS

This application is the U.S. National Phase of International Application No. PCT/EP2012/057829, filed Apr. 27, 2012, claiming benefit of U.S. Provisional Patent Application No. 61/481,159, filed Apr. 30, 2011, the contents of which are hereby incorporated by reference in their entirety as part of the present disclosure.

FIELD OF THE INVENTION

The present invention relates to an optical link combining wavelength domain multiplexing (WDM) with coherent detection.

BACKGROUND OF THE INVENTION

An optical frequency comb is light with an optical spectrum consisting of multiple discrete frequency components. The frequency difference between adjacent frequency components is substantially constant and called the frequency offset. The phase difference between adjacent frequency components is substantially constant and called the phase offset. In other words, individual frequency components are described by $\exp(i \times \omega_j t + \phi_j)$ where i is the index of the frequency component, $\omega_j$ the angular frequency of the frequency component and $\phi_j$ the phase of the frequency component. In a looser terminology, an optical comb can also refer to a spectrum of multiple frequency components where the frequency difference between adjacent frequency components is substantially constant, but the phase difference between adjacent frequency components is not fixed to a constant phase difference. The former is referred to specifically as a mode-locked frequency comb because the phase difference between adjacent frequency components is locked to a fixed phase offset.

A semiconductor laser, such as an edge emitting Fabry-Perot laser, can lase simultaneously in multiple resonances of the laser cavity, thus forming an optical frequency comb in the loose sense. In particular, quantum dots provide a good gain material for such semiconductor comb lasers, as their gain spectrum is inhomogeneously broadened. This allows the laser to have stable emission in multiple cavity resonances without gain competition leading to unstable comb components. Semiconductor lasers can also be made to provide mode-locked frequency combs. One possibility is to incorporate a saturable absorber in the laser cavity. In other cases nonlinear processes inside the laser such as four wave mixing can lead to mode locking of the comb components. Such a comb laser is one type of frequency comb source.

An alternate way of generating optical frequency combs in a compact system is to utilize parametric generation in optical resonators, so called optical parametric oscillators (OPO). Of particular interest is the optical frequency comb generation inside chip-scale resonators integrated with other chip-scale optics, since this allows the realization of a compact, robust and cost-efficient system. One class of micro-resonators allowing chip scale frequency comb generation consists in whispering gallery mode resonators made out of silicon dioxide, silicon nitride or other chip scale dielectrics. The light from a laser with an emission spectrum corresponding substantially to a single frequency can be coupled to such an optical micro-resonator. The comb is generated via parametric light generation (e.g. four wave mixing). This results in a mode locked comb with the mode locking provided by the nature of the parametric generation processes. This is another class of frequency comb sources. The terminology micro-resonators is not restricted here to micron sized structures, but generally refers to chip scale resonators. The system can also be implemented with resonators that are not chip-scale.

Wavelength domain multiplexing (WDM) consists of transporting light with multiple frequency components in an optical fiber or an optical waveguide (a section of the optical link) where frequency components are independently modulated with separate data streams and thus form an independent data channel. Given an optical data modulation rate, the aggregate data transport rate of the system can be demultiplied by the number of independently modulated frequency components. The center frequency of the modulated frequency component is also referred to as the center frequency of the channel or the optical carrier frequency of the channel. Several channels, each corresponding to a different optical center frequency, can be transported through a given fiber, i.e. through a given optical link. Compact frequency comb sources such as comb lasers or micro-resonators are particularly useful in this context since they allow generating several frequency components in a single compact device.

Coherent detection is a technique by which the optical power efficiency of an optical link or of individual optical channels can be increased. That is to say, a lower amount of optical power is required for a channel with a given data rate. Coherent detection is based on optically mixing the incoming optical channel at the receiver with light generated by a local coherent light source, also referred to here as the local light source or the receiver light source. Mixing refers here to combining (summing) the incoming light with at least a portion of the locally generated light, thus generating an interference signal. This effectively reamplifies the optical signal, making it easier to overcome the electronic noise floor of the receiver.

The complex amplitude of the incoming optical channel is denoted as $a \times \exp(i\omega_a t + i\phi_a)$, where t is the time, a is a real positive number (that can depend on time, for example in case of amplitude modulation), $\phi_a$ is the phase of the incoming optical channel (that can depend on time for example in case of phase modulation) and $\omega_a$ is the angular center frequency of the incoming optical channel. In the following, frequencies denoted by $\omega$ are taken by default to be angular frequencies. Similarly, the complex amplitude of the locally generated light with which the incoming optical channel is mixed is denoted as $b \times \exp(i\omega_b t + i\phi_b)$. Mixing the incoming channel with the locally generated light and detecting the resulting power with a photodetector results in an AC electrical signal component proportional to $a \times b \times \cos(\omega_a t - \omega_b t + \phi_a - \phi_b + \theta)$, where $\theta$ is a phase dependent on the device used to implement the mixing, e.g. a Y-junction, a directional coupler or a multi-mode interferometer. $\theta$ can also be dependent on additional optical elements in the receiver, such as optical delays in the waveguide routing, for example in a 90 degree hybrid. If the local receiver light source is adjusted so that its emission frequency is equal to the center frequency of the incoming optical channel, one speaks of homodyne coherent detection. On the other hand, if the local receiver light source has a frequency that differs from the center frequency of the incoming optical channel, one speaks of heterodyne coherent detection. It can be seen that the incoming optical signal is essentially multiplied by b, the amplitude of the locally generated light. Additionally, the locally generated light can also provide a phase reference in case of phase shift keying (PSK), quadrature phase shift keying (QPSK) or other encoding schemes that use the optical phase as a degree of freedom to encode data.

A ninety degree hybrid refers to an optical device that allows to mix two optical signals $a \times \exp(i\omega_a t + i\phi_a)$ and $b \times \exp(i\omega_b t + i\phi_b)$ and generate at least two signals with an instantaneous time varying optical power component proportional to $a \times b \times \cos(\omega_a t - \omega_b t + \phi_a - \phi_b + \theta)$ and an instantaneous time varying optical power component proportional to plus or minus $a \times b \times \sin(\omega_a t - \omega_b t + \phi_a - \phi_b + \theta)$, where $\theta$ is an implementation specific phase. Typically, a 90 degree hybrid creates four signals proportional to plus and minus $a \times b \times \cos(\omega_a t - \omega_b t + \phi_a - \phi_b + \theta)$ and to plus and minus $a \times b \times \sin(\omega_a t - \omega_b t + \phi_a - \phi_b + \theta)$.

A 90 degree hybrid can be realized by first splitting the incoming channel into two separate waveguides WG1 and WG2, by splitting the locally generated light into two different waveguides WG3 and WG4, by effectively adding a $\pi/2$ phase delay to one of the four optical paths (explicitly or by nature of the splitting/mixing devices), and by mixing WG1 with WG3 and WG2 with WG4. Another possibility is to implement a 90 degree hybrid with a 2 by 4 multi-mode interferometer.

In a homodyne coherent detector, $\omega_a t$ and $\omega_b t$ cancel each other out. The electrical signal generated by the photodetector, $a \times b \times \cos(\phi_a - \phi_b + \theta)$, is a baseband representation of the data in the sense that it is not multiplied with an intermediate frequency signal (IF) of finite frequency $\omega_a t - \omega_b t$. For example, if the incoming channel is encoded with amplitude shift keying, $\phi_a - \phi_b + \theta$ can be chosen to be zero, so that the generated signal is $a \times b$. The incoming signal has been amplified by b. If the incoming channel is encoded with a phase shift keying with $\phi_a$, switching between $\phi_a - \Delta_a/2$ and $\phi_a + \Delta\phi_a/2$, $\phi_b - \theta$ can be chosen to be equal to one of $\phi_a \pm \pi/2$ so that the optical signal is converted into an amplitude coded electrical signal with maximized amplitude. For decoding a QPSK signal, a 90 degree hybrid is required. In this case the incoming optical channel and the locally generated light are interfered and detected so as to produce at least two separate AC signals in quadrature to each other, $a \times b \times \cos(\phi_a - \phi_b + \theta)$ and one of $a \times b \times \cos(\phi_a - \phi_b + \theta \pm \pi/2)$. This allows for example to detect $a \times b \times \cos(\phi_a)$ and $a \times b \times \sin(\phi_a)$ and to demodulate the QPSK signal. In a typical receiver the data is digitized by a thresholding circuit after demodulation. It is important to maximize the signal strength prior to the thresholding circuit in order to maximize the noise tolerance of the receiver.

If the optical mixing device is chosen as a 2 by 2 port device, two complementary optical signals are generated. Once detected by two separate photodiodes such as in a balanced receiver, two complementary AC electric signals are generated, $a \times b \times \cos(\omega_a t - \omega_b t + \phi_a - \phi_b + \theta)$ and $-a \times b \times \cos(\omega_a t - \omega_b t + \phi_a - \phi_b + \theta)$. By taking the difference between these two electrical signals, the signal amplitude can be doubled, thus increasing the optical power efficiency of the channel. In case of a 90 degree hybrid such as for QPSK demodulation, four AC signals can be generated, $\cos(\omega_a t - \omega_b t + \phi_a - \phi_b + \theta)$, $-a \times b \cos(\omega_a t - \omega_b t + \phi_a - \phi_b + \theta)$, $a \times b \cos(\omega_a t - \omega_b t + \phi_a - \phi_b + \theta + \pi/2)$ and $-a \times b \cos(\omega_a t - \omega_b t + \phi_a - \phi_b + \theta + \pi/2)$. By taking the difference between $\cos(\omega_a t - \omega_b t + \phi_a - \phi_b + \theta)$ and $-a \times b \cos(\omega_a t - \omega_b t + \phi_a - \phi_b + \theta)$ and by taking the difference between $a \times b \cos(\omega_a t - \omega_b t + \phi_a - \phi_b + \theta + \pi/2)$ and $-a \times b \cos(\omega_a t - \omega_b t + \phi_a - \phi_b + \theta + \pi/2)$ with two balanced receivers, the signal strength of the two AC components relevant to the QPSK signal can be doubled. In general, using balanced receiver architecture allows doubling the signal strength and cancelling DC offsets.

One difficulty with homodyne coherent detection is to phase and frequency lock the local light source with the center frequency and average phase of the incoming optical channel. This can be achieved with an optical phase locked loop (OPLL). In an optical phase locked loop, the light from the incoming optical channel is mixed with the locally generated light and converted into the electrical domain with a photodetector. The resulting signal contains an AC component whose frequency is proportional to the difference between the center frequency of the incoming optical channel and the frequency of the local light source. In the small signal limit, the time varying component is also proportional to the instantaneous phase difference between the incoming channel and the locally generated light ($\omega_a t - \omega_b t + \phi_a - \phi_b + \theta$). It serves as a feedback signal for a phase locked loop. The controlled oscillator of the phase locked loop is the local light source of the receiver, that can be tuned by a number of parameters. For example, in the case of a laser by changing its temperature, its injected drive current or by adjusting an additional laser control, such as the electrical signal applied to a phase tuning section if such a section is implemented. The feedback signal is typically low pass filtered before being applied to the local light source. An optical phase locked loop locks both the frequency and the phase of a single frequency local light source to the center frequency and average phase of an incoming optical channel with which the local light source is mixed as part of the OPLL. The resulting locally generated light is described by $\exp(i\omega_a t + i\phi_a + \theta)$ once the OPLL is locked. The phase difference $\theta$ is dependent on the implementation of the optics and can be chosen to warrant maximum data signal strength after coherent detection and demodulation.

OPLLs can be implemented with analog electronics, as well as with mixed signal or digital electronics. The latter requires digitizing the photodetected signal for further digital processing.

Due to the complexity of implementing an OPLL, it is sometimes easier or more desirable to use heterodyne coherent detection. In heterodyne coherent detection, the local light source at the receiver is left free running or is just coarsely adjusted to the frequency of the incoming optical channel. This results in the local light source emitting light with a different frequency than the center frequency of the incoming optical channel. This results in an AC signal $a \times b \times \cos(\omega_a t - \omega_b t + \phi_a - \phi_b + \theta)$ after photodetection where the term $\omega_a t - \omega_b t$ is non-zero. In order to demodulate the signal, the frequency difference $\omega_a - \omega_b$ (called the intermediate frequency) has to be tracked as part of an electronic demodulation procedure. The center frequency of the incoming channel and the frequency of the local light source should be sufficiently close to each other for the electronics to be able to track $\omega_a - \omega_b$. This can be achieved for example by at least coarsely controlling or temperature stabilizing the local light source. The term $\omega_a t - \omega_b t$ results in an intermediate frequency modulation (IF) that is superimposed to the data modulation in the AC signal. An electronic phase locked loop (EPLL) is used to lock an electrical oscillator, e.g. a voltage controlled oscillator (VCO), to the IF signal. The signal from the electrical oscillator is referred to as the intermediate frequency reference or the recovered intermediate frequency carrier (these two terminologies are used interchangeably). It is then electrically mixed to the AC signal $a \times b \times \cos(\omega_a t - \omega_b t + \phi_a - \phi_b + \theta)$ to demodulate it into $a \times b \times \cos(\phi_a - \phi_b + \theta + \eta)$, where $\eta$ is a phase that is dependent on the implementation of the electric circuit and can be chosen to maximize the demodulated data signal strength. An EPLL can take the form of an analog PLL, a digital PLL or a mixed signal PLL.

Phase locked loops are sometimes operated as frequency locked loops in the loop start-up phase in order to increase their capture range. Once frequencies are locked or sufficiently close, operation is switched to phase locking so as to achieve both phase locking and frequency locking, since a frequency locked loop can only lock the frequencies together. This concept can be applied both to OPLLs and EPLLs.

A further method to demodulate a coherently detected signal is to use feed forward carrier recovery. In the terminology "feed forward carrier recovery," carrier does not refer to the optical carrier of the incoming channel, but to the electrical carrier of the photodetected channel in the form of the intermediate frequency. This method has the same task than the OPLL or EPLL described previously in that it detects the phase and frequency of the intermediate frequency and uses this information to demodulate the signal. However, instead of relying on a feedback loop, feed forward data processing is employed. PLLs are very sensitive to delays in the feedback path making their realization challenging. Feed forward carrier recovery is a means to circumvent this difficulty. One way to implement a feed forward carrier recovery system is to digitize the signals generated by the photodetectors with high-speed analog to digital converters (ADC) and to use digital electronics, for example in the form of an FPGA, of a DSP processor or of a dedicated ASIC to implement the feed forward carrier recovery algorithm. The same architecture can also be used to implement a digital PLL after digitization of the photodetected signal by an analog to digital converter. The data can also be directly demodulated in the digital domain, in this case however one difficulty resides in the fact that the signals have to be typically sampled at the Nyquist rate and very high speed ADCs are required.

Coherent detection can be implemented in a WDM system. In a conventional WDM system the light for each communications channel is generated with a separate laser, since the light of different channels need to have distinct center frequencies. For each communication channel there also needs to be a corresponding locally generated light at the receiver with a close by frequency (heterodyne detection) or an identical frequency (homodyne detection). In a conventional WDM system, this would be implemented by providing a distinct local receiver laser for each optical channel. In addition, each of the channels need a distinct OPLL, EPLL or feed forward carrier recovery. This results in a high system complexity and a high number of costly components.

The novel system architecture disclosed here is particularly attractive if implemented with a high level of integration, since this allows achieving significant reduction of cost, size and electrical power consumption. One particularly attractive technology in this context is the realization of integrated optical components in silicon based technology, Silicon Photonics. It allows the realization of high-speed infrared optical detectors based on the integration of Germanium, of high-speed modulators for example in the form of Mach-Zehnder Interferometers (MZI) or resonant ring modulators, as well as filtering and frequency domain multiplexing/demultiplexing of light, for example with arrayed waveguide gratings, Echelle gratings or resonant ring based filters or add/drop multiplexing. By coupling several rings to each other rather than using a single ring, flat top filters and add/drop multiplexers can be realized allowing to relax the constraints on fabrication tolerances, laser frequency, temperature stabilization and control systems.

One of the drawbacks of Silicon Photonics is that it is a technology with high optical losses at fiber to chip interfaces and within optical modulators. For this reason, coherent detection, a method that allows increasing the optical power efficiency of optical links and thus to partially compensate for optical losses, is particularly attractive in this context. Since the demodulated signal is proportional to $a \times b$ as opposed to $a^2$ as in an incoherently detected system, optical channels are only penalized by incurred losses with half the power penalty in dB.

Silicon photonics is also a technology that allows easily duplicating devices in a single chip, thus increasing system complexity at little additional cost and space. For this reason optical sources generating multiple optical frequency components such as comb lasers or optical parametric oscillators are particularly interesting when used together with Silicon Photonics. The frequency components of the optical comb source can be independently modulated inside a silicon photonics chip implemented at the transmitter and the multiple incoming optical channels can be independently coherently detected on a silicon photonics chip implemented at the receiver. Receiver and transmitter can be combined in a single Silicon Photonics chip at either end of a duplex link. Thus a complete WDM transceiver can be realized with a Silicon Photonics chip, an optical comb source and additional electronics. Silicon Photonics also allows single-chip integration of optics with electronics, thus allowing single-chip integration of the optics with a large portion of the required specialized electronics.

SUMMARY OF THE INVENTION

The present invention relates to an optical link combining wavelength domain multiplexing (WDM) with coherent detection. The receiver light source for more than one WDM channel is implemented in the form of an optical frequency comb source. The transmitter light source for said more than one WDM channels is implemented in the form of another frequency comb source. Constant or approximately constant frequency offsets and/or phase offsets between the frequency components of the optical combs are used to reduce the number of optical phase locked loops (OPLL), electrical phase locked loops (EPLL) or feed-forward carrier recovery in the system. A combination of two of one of an OPLL, an EPLL or a feed-forward carrier recovery is utilized to completely lock a mode-locked receiver frequency comb source to a mode-locked transmitter frequency comb source. In the absence of good frequency comb mode-locking, approximately constant frequency offsets of the optical combs can still be used to replace all but one of the PLLs by slow digital phase locked loops or slow digital feed-forward carrier recovery. The method is suitable to a large number of channels.

More specifically, the present invention relates to a WDM link implementing coherent detection at a receiver where a mode locked optical frequency comb source is utilized as a multi-carrier-frequency light source at a transmitter and a mode locked optical frequency comb source is utilized as a multi-frequency-component local light source at said receiver. The multi-frequency-component local light source provides the individual frequency components required to coherently detect incoming optical channels. Coherent detection and demodulation is implemented with a reduced number of phase locked loops or feed forward carrier recovery systems. The architecture leverages the mode locked nature of the transmitter and receiver light sources in order to achieve this reduction in complexity. The reduced complexity can result in more compact systems, cheaper systems or systems with lower power consumption. The local multi-frequency-component light source of the receiver is called the receiver optical comb source and generates the receiver optical comb. The multi-carrier-frequency light source at the transmitter is called the transmitter optical comb source and generates the transmitter optical comb. In the context of OPLLs, one comb source is at least partially controlled according to another comb source. The controlled comb source is then called the slave comb source and the other comb source is then called the master comb source. The slave comb source is typically the receiver comb source and the master comb source is typically the transmitter comb source, but this is not necessarily the case as other architectures are also described. In an OPLL, an optical oscillator, here in the form of an optical comb source, is controlled with a control signal. This control signal allows adjusting the center frequencies of individual comb components, the frequency offset between adjacent frequency comb components, or a combination thereof. Two control signals are said to allow independent control of center frequency and of frequency offset if center frequency and frequency offset can be independently adjusted by a combination of the two control signals. This is mathematically defined in a later paragraph. Two optical PLLs are said to be independent of each other if they adjust control signals that allow independent control of center frequency and frequency offsets.

In a mode locked optical frequency source, both the frequency offset and the phase offset between adjacent frequency components have a fixed value independent on which two adjacent frequency components are considered. This frequency and phase locking inherent to the optical frequency comb source allows a drastic reduction of system complexity. Indeed, there are only 4 degrees of freedom describing an ideal mode locked frequency comb, the angular frequency $\omega 0$ and phase $\phi 0$ of one of the comb components, hereafter called the component of index 0, and the angular frequency difference $\Delta\omega$ and phase difference $\Delta\phi$ between adjacent frequency components. The frequency difference $\Delta\omega$ is called the free spectral range (FSR) of the optical comb. The frequency components of the optical comb are numbered with an index, with smaller index for components at lower frequencies and higher index for components at higher frequencies. In the following descriptions, when two frequency combs that are at least roughly aligned are described in the context of the coherent detection WDM system, frequency components of the two combs that fall within the same WDM frequency window, as defined by the implemented frequency domain demultiplexer(s) in the receiver, are attributed the same index.

A single optical PLL can lock a frequency and a phase of the receiver optical comb, for example $\omega_0$ and $\phi_0$, to a phase and frequency reference provided by an incoming optical channel. A second OPLL controlling the receiver optical frequency comb source with a different control signal can lock two additional degrees of freedom. These can, for example, be the frequency and phase of another receiver optical comb component of index m, $\omega_m$ and $\phi_m$, locked to another incoming channel, where m is a positive or negative integer. The center frequency of the incoming channel used to lock $\omega_m$ and $\phi_m$ is chosen to be spaced by m free spectral ranges of the transmitter optical comb from the center frequency of the incoming channel used to lock $\omega_0$ and $\phi_0$. The parameters locked by the second OPLL can also be the FSR and phase offset of the receiver optical comb, $\Delta\omega$ and $\Delta\phi$, locked to the FSR and phase offset of the transmitter optical comb. This can be achieved by taking the difference of the intermediate frequencies of two distinct channels as the feedback signal. Locking two frequency components of the slave comb is sufficient to lock the entire comb as all 4 degrees of freedom are locked. Similarly, locking one frequency component of the slave comb as well as locking the free-spectral range of the slave comb with an OPLL is sufficient to lock the entire comb as al 4 degrees of freedom are locked. The controlled (slave) receiver optical frequency comb is then completely locked to the reference (master) transmitter optical frequency comb. In other words, each of the frequency components of the receiver optical comb are then locked to a corresponding component of the transmitter optical comb. This is a substantial reduction in system complexity, since two PLLs are sufficient to completely lock the coherent receivers for all the channels (i.e., to zero all the channel specific intermediate frequencies and lock all the channel specific phase difference between incoming optical carrier and locally generated frequency component to a value that maximizes the recovered data signal strength), while in a conventional architecture a separate OPLL, EPLL, or feed forward carrier recovery is required for each channel.

In order to allow two OPLLs to independently tune the slave optical comb source, there need to be at least two control signals that can be applied to the latter. In the case of a semiconductor comb laser these control signals can for example be two of the temperature of the laser as adjusted for example by a heater or a Pelletier element, the primary drive current of the laser or an electrical signal applied to a phase tuning section inside the semiconductor laser. In an optical parametric amplifier (OPO), these control signals can be one of the temperature of the OPO as directly regulated for example by a heater or by a Pelletier element, the optical power injected (coupled) into the OPO, the frequency of the light injected into the OPO, a signal applied to a phase tuning section inside the OPO, the drive current of the laser pumping the OPO, the temperature of the laser driving the OPO, or a signal applied to a phase tuning section of the laser pumping the OPO. In addition to the implemented OPLL(s) controlling the OPO or controlling the laser pumping the OPO, there can also be a control loop aligning the center frequency of the laser pumping the OPO to a resonance of the OPO or aligning a resonance of the OPO to the center frequency of the laser pumping the OPO, whereby the control system can be of a different nature than an OPLL, such as tracking and maximizing the pump power coupled into the OPO by using a monitor photodiode. When implemented with a micro-cavity, one of the resonances of the micro-cavity typically tracks the frequency of the injected light due to a self-regulating mechanism induced by optical nonlinearities and self-heating of the micro-cavity. If the micro-cavity is pumped with a semiconductor laser pump, the frequency of the semiconductor laser is typically controlled with a first OPLL that regulates the semiconductor laser pump temperature, drive current or phase tuning section. The feedback-signal for this OPLL can be either tapped before or after the OPO. A second OPLL can for example control the OPO temperature or the semiconductor laser pump output power. The temperature of the OPO can also be controlled by a control loop that aligns an OPO resonance to the center frequency of the semiconductor laser. Another configuration is to adjust the OPO temperature with an OPLL such that one of the OPO resonances is aligned with an incoming channel, or such that the FSR of the OPO is adjusted to the FSR of the incoming optical comb. The semiconductor laser pump can then be controlled by a second OPLL or by a control loop that aligns the center frequency of the semiconductor laser pump to one of the OPO resonances.

The beat note (intermediate frequency) between a frequency component of the slave optical comb and a frequency component of the master optical comb takes the form $a^2+b^2+2\times a\times b\times\cos(\omega_a t-\omega_b t+\phi_a-\phi_b+\theta)$ after being converted in the electrical domain by a photodetector, where a, $\omega_a$, $\phi_a$ are the amplitude, frequency and phase of the frequency component of the master optical comb and b, $\omega_b$, $\phi_b$ are the amplitude, frequency and phase of the frequency component of the slave optical comb. $\theta$ depends on the optics used to mix the two optical signals. When $2\times a\times b\times\cos(\omega_a t-\omega_b t+\phi_a-\phi_b+\theta)$ is the signal used as a feedback for the OPLL, an offset cancellation mechanism would normally be needed to cancel $a^2+b^2$. This problem can be remedied by using a differential architecture in which $a^2+b^2+2\times a\times b\times\cos(\omega_a t-\omega_b t+\phi_a-\phi_b+\theta)$ is generated and recorded at one output port of the mixing device and $a^2+b^2-2\times a\times b\times\cos(\omega_a t-\omega_b t+\phi_a-\phi_b+\theta)$ is generated and recorded at another output port of the mixing device. By taking the difference between the two signals one obtains $4\times a\times b\times\cos(\omega_a t-\omega_b t+\phi_a-\phi_b+\theta)$ which can be directly used as a feedback signal for the OPLL. These two complementary beat signals are readily obtained from 2 by 2 mixing devices such as 2 by 2 directional couplers or 2 by 2 multi-mode interferometers. Such complementary signals are also typically obtained from more complex optical mixers such as 90 degree hybrids. Beat frequency and intermediate frequency are interchangeable with each other. Beat phase and phase of the intermediate frequency reference are also used interchangeably. They respectively refer to the frequency and phase of the electrically recorded interference between the optical carrier of an incoming channel and the comb component of the receiver frequency comb component with which it is optically mixed.

Additional difficulties can arise when data modulation is applied at the transmitter to the frequency component of the master optical comb involved in the OPLL(s). In this case $a$ and/or $\phi_a$ are time varying. One possibility to alleviate this difficulty is to use a dedicated frequency component for the OPLL that is not modulated, and only to modulate frequency components of the transmitter (master) optical comb that are not involved in OPLLs. In the case of phase modulation, the feedback signal can be written as $a\times b\times\cos(\omega_a t-\omega_b t+\phi_a\pm\Delta\phi_a-\phi_b+\theta)$ in the case where the comb component of the master optical comb involved in the OPLL is actively modulated. If the intermediate frequency is significantly slower than the data modulation rate, it can be seen that the average of $a\times b\times\cos(\omega_a t-\omega_b t+\phi_a\pm\Delta\phi_a-\phi_b+\theta)$ is proportional to the required feedback signal $a\times b\times\cos(\omega_a t-\omega_b t+\phi_a-\phi_b+\theta)$ when the optical data is DC balanced (equal number of zeros and ones over time periods small enough to lie outside the OPLL loop bandwidth). Since a low pass filter is already typically explicitly implemented in the OPLL feedback loop or implicitly implemented due to bandwidth limitations of the photodiode, frequency comb source or of individual sub-circuits this leads to a proper functioning of the OPLL. This has the additional advantage that the resulting average bias point $\phi_b-\theta=\phi_a\pm\pi/2$ is also the required bias point to obtain a demodulated data signal with maximized amplitude if the data is recorded at the same or an equivalent location of the optical circuit than where the feedback for the OPLL is taken. In the case where the optical channels are recorded in a location of the optical circuit that is equivalent to where the feedback signal of the OPLL is taken, but where the master comb components involved in the OPLLs are not modulated, the average phase modulation phase $\phi_a$ should be applied to them continuously in order for the OPLLs to converge to a phase that maximizes signal strength.

In case of amplitude modulation, the control loop implemented in this manner results in a bias point that is not directly compatible with detecting the data, since $a\times b\times\cos(\phi_a-\phi_b+\theta)$, assuming $\omega_a$ is locked to $\omega_b$, will be zero no matter the amplitude b. In order to remedy this a 90 degree hybrid can be implemented, wherein the two ports $\pm a\times b\times\cos(\omega_a t-\omega_b t+\phi_a-\phi_b+\theta)$ are used for the OPLL, and the two ports $\pm a\times b\times\sin(\omega_a t-\omega_b t+\phi_a-\phi_b+\theta)$ are used for the balanced receiver detecting the data flow. Since $\cos(\phi_a-\phi_b+\theta)$ is driven to zero by the OPLL, $\sin(\phi_a-\phi_b+\phi)$ is driven to 1, resulting in a maximized signal strength. Since the optical power required by the balanced receiver might be different (typically higher) than the optical power required by the OPLL, the 90 degree hybrid can be implemented by first tapping some power from a and tapping some power from b, and then mixing the remaining power from a and b, for example to provide the signals for the balanced receiver detecting the data, and by mixing the tapped power from a and b after adding a $\pi/2$ phase shift to one of the optical paths, for example to provide the feedback signal for the OPLL. By adjusting the tapping ratio, the signal strength can be asymmetrically split between the balanced receiver and the OPLL. The same architecture can be implemented when there is no data modulation applied to the master comb components involved in the OPLLs. However, in this case it is also possible to mix all the incoming channels with 2 by 2 couplers, but to add an additional $\pi/2$ phase shift to the 2 by 2 coupler involved with generating the feedback signal for the OPLL(s). Alternatively, the feedback for the OPLLs can be taken at an equivalent point of the optical circuit from where data is recorded with balanced receivers for the other channels, but the constant phase applied to the frequency components of the transmitter optical comb involved in the OPLLs should be shifted by $\pi/2$ relative to the phase of the other channels.

Finally, the OPLL feedback can also be generated from a modulated master comb component when complex DC-balanced constellation diagrams such as in the case of QPSK are used. In this case it can be necessary to create further signals with optical hybrids. For example in the case of QPSK, one can create the signals s1 and $s2\pm a\times b\times\sin(\omega_a t-\omega_b t+\phi_a-\phi_b+\theta)$, s3 and $s4\pm a\times b\times\sin(\omega_a t-\omega_b t+\phi_a-\phi_b+\theta+\pi/4)$ and s5 and $s6\pm a\times b\times\sin(\omega_a t-\omega_b t+\phi_a-\phi_b+\theta+\pi/2)$. If s3 and s4 are used for the OPLL, signals s1 and s2 can be used for one of the two QPSK balanced receivers and signals s5 and s6 can be used for the other balanced receiver. In case there is no data modulation applied to the master comb components involved in the OPLLs, a constant phase should be applied to them corresponding to the average of the phases of the in-phase (I) and quadrature (Q) signals of the modulated QPSK channels in order to ensure maximum signal strength. Alternatively and preferentially, when there is no data modulation applied to the master comb components involved in the OPLLs, the incoming light from the transmitter frequency comb and the light from the local receiver (slave) frequency comb can be simply mixed with a 90 degree hybrid, as are the other channels that are actually transporting data. In this case the feedback for the OPLLs is taken at one of the waveguide pairs normally connected to a balanced receiver for the other comb components. This way maximum signal strength is obtained for all the channels provided the constant phase applied to the transmitter comb components involved in the OPLLs corresponds to the phase normally applied to I-channels (respectively Q-channel) and the OPLL signal is taken at the waveguide pair normally connected to the balanced receiver recording the Q-channel (respectively I-channel).

In a conventional architecture, all the comb components of the incoming transceiver channel would first be split by center frequency, all the comb components of the receiver frequency comb would be split by center frequency and the corresponding frequency components then individually mixed in 2 by 2 couplers, 90 degree hybrids or other adequate optical circuits. Here it is desirable to first mix the light incoming from the transmitter (or at least a large subset of the incoming optical channels) and the light from the receiver frequency comb (or at least a large subset of the receiver optical comb components) before frequency demultiplexing the comb components, and to then split the comb components by communication channel after mixing. On the one hand this reduces the number of mixing devices that need to be implemented. On the other hand this also ensures by design that any phase errors incurred due to waveguide fabrication tolerances, temperature drift or waveguide dispersion are seen by all the channels and are thus also automatically compensated for by the OPLLs.

After mixing, the individual WDM communication channels can be separated by coupling the outputs of the mixing devices to frequency selective ring based add-drop multiplexers or other resonant add-drop multiplexers. These can take the form of single ring add-drop multiplexers whose drop port is connected to a photodetector. They can also take the form of devices with multiple coupled rings that allow achieving a flat band transfer function. A further alternative is to couple the output of the mixing devices to frequency selective resonant photodetectors that inherently only detect a single channel.

Another possibility is to use frequency domain demultiplexers such as arrayed waveguide gratings (AWGs) or Echelle Gratings. Instead of connecting one such demultiplexer to each output port of the optical mixing device, it is desirable to use a single demultiplexer or a reduced number of demultiplexers with several input ports. The input ports can be positioned in such a way that the output ports corresponding to each of the input ports are interleaved with each other while having minimum cross-talk. This has the advantage that a single demultiplexer can take care of all the outputs of the mixing device. This has the additional advantage that the signals corresponding to the same communications channel are routed to adjacent output ports of the demultiplexer, thus facilitating further downstream connectivity to photodiodes and to electronics. A general configuration is to use a multiplexer such as an AWG or Echelle grating with multiple inputs connected to the outputs of the mixing device, in such as way that the individual inputs of the demultiplexers are routed to distinct subsets of the demultiplexer outputs. These subsets can also be different groups of adjacent output ports.

At the transceiver, ring based resonant modulators such as ring based phase modulators or ring based resonant amplitude modulators can provide a convenient means of selectively modulating the transmitter frequency comb components without requiring a pair of AWGs or Echelle gratings to demultiplex and remultiplex the light prior and after a modulator array.

A combination of coarse multiplexers with a free spectral range that is smaller than the total spectral width of the frequency combs combined with resonant photodetectors, resonant add-drops or resonant modulators can be used to reduce system constraints. The free-spectral range of the resonant devices needs only be larger than the channel spacing of the coarse multiplexer, rather than being preferentially larger than the total spectral width of the frequency combs in the absence of coarse multiplexers. The coarse multiplexers on the other hand do not need to have the high spectral resolution of the WDM system. Another combination is that of an interleaver with resonant photodetectors, resonant add-drops or resonant modulators. This is for example of benefit if the variation of resonant frequencies of the resonant devices due to fabrication tolerance is more than the WDM channel spacing. By doubling the channel spacing for subsystems connected to interleavers, the one to one attribution between device resonances and specific comb components is facilitated.

In a fully duplex optical link, instead of dedicating frequency comb sources fully to either the transmitter or receiver on either side, it can be desirable to dedicate a subset of the frequency components to the receiver and another subset to the transmitter on either side of the link. For example, a comb frequency source with 24 frequency components can be split into two subsets of 12 frequency components each. The first subset can be used in the transmitter and the second subset can be used in the receiver. On the other side of the link, the same splitting is implemented, but the role of the two subsets is swapped, as the transmitter frequencies on one side of the link have to match the receiver frequencies on the other side of the link and vice versa. This way a CXP module with 12 fully duplex channels could for example be realized with a single comb laser on either side of the link. Due to the increased optical power efficiency resulting from coherent detection, it is possible to transport that many high speed channels with a single laser pair. Almost 3 dB improvement is resulting from the balanced photodetector architecture and another substantial improvement from penalizing losses in the link at only 50% of their incoherent detection penalty (in dB). This can result in more than a 3× improvement. Another advantage of splitting a single frequency comb source between the receiver and the transmitter is that OPLLs need only be implemented on one side of the link. If the two comb sources are already aligned to each other, there is no need to implement further OPLLs on the other side of the link. In an architecture where slave and master optical comb sources are not directly attributed to receiver and transmitter, descriptions in the previous and following paragraphs still apply by replacing "receiver optical comb" by "slave optical comb" and "transmitter optical comb" by "master optical comb." One way of splitting the combs into two subsets is to use an interleaver. This has the additional advantage that the frequency spacing between the comb components routed to a given transmitter or receiver is double the frequency spacing of the initial frequency comb, thus relaxing constraints related to fabrication tolerance and thermal drift of resonant add-drops, resonant modulators or resonant photodetectors.

The systems described here can be implemented with polarization maintaining fiber, for example to facilitate polarization dependent coupling to and from the optical chips or due to polarization sensitivity of optical devices on the optical chips, or it can be implemented with non-polarization-maintaining single mode fiber, for example in conjunction with polarization splitting grating couplers. Polarization splitting grating couplers can also be utilized as functionally equivalent to polarization beam splitters in conjunction with polarization maintaining fiber (or in conjunction with non-polarization maintaining fibers at the cost of additional system complexity to deal with polarization scrambling) in order to use polarization as an additional degree of freedom to encode data, such as with dual polarization amplitude modulation, dual polarization phase shift keying or dual polarization QPSK.

One difficulty lies in adjusting the 4 parameters describing an optical comb to each other for the receiver (slave) optical comb and the transmitter (master) optical comb. This task is taken care of by the two OPLLs. Another difficulty however resides on the fact that the optical combs have a finite number of frequency components as described by the envelope function of the optical comb. Thus, shifting the frequency of a comb component by an entire free spectral range is not devoid of system penalty, but shifts the envelope function of one optical comb relative to the envelope function of the other optical comb. This can have a high penalty, specifically for the links close to the outer edges of the transmitter comb envelope function, since they might end up being paired with a much weaker component of the receiver comb. The envelope function of a frequency comb can be shifted by plus/minus an entire FSR by having an OPLL lock on a different loop stabilization point corresponding to shifting the spectrum by an FSR. This can be achieved by restarting the OPLL in the convergence domain of said other stabilization point by adding an offset to the initial value of the control signal.

When two OPLLs are implemented simultaneously, they can have different stabilization time constants. For example temperature changes typically take a much longer time to be applied and to stabilize than changes in laser drive current. In such a case, the slower loop can be seen as the primary loop and the faster loop as a secondary loop that tracks the slower loop. One way to change the convergence point of the OPLLs is to change the initial setting of the control signal of the slower primary loop, for example if said loop regulates temperature.

One method to determine whether the envelope function of the receiver optical comb is well aligned with its target is to provide more output ports than otherwise necessary from the demultiplexing device that correspond to frequency components outside the targeted envelope function and to monitor the power in these output ports. Substantial power in these ports, or lack of power on the other side of the comb spectrum, indicates that the envelope function is off target. The position of the receiver optical comb can be shifted back and forth, and the summed power at balanced receivers monitored. By summing the powers at the balanced receivers (rather than taking the difference as usual) the effect of data modulation and interference between the two combs are removed, so that the sum of the powers of the comb components of the two frequency combs routed to said balanced receivers are recorded. This results in a data set from which the optimum position of the receiver comb relative to the transmitter comb can be extracted, as varied by the value of the control signal(s). The control setting(s) for this optimum position can then be taken as initial setting for one or both of the OPLLs, for example the primary OPLL, or it can be enter a calculation to determine the initial setting for one or both the OPLLs. A similar method is to record the power at the balanced receivers, preferentially as the sum of the power at the balanced receivers (or of equivalently positioned photodetector such as connected to taps, i.e., by taking the sum of the optical power levels in all or a subset of the complementary optical signal paths belonging to a given channel after the mixer and demultiplexer and by preferentially summing these readings for a given channel) when the receiver optical frequency comb source is switched off and when it is switched on. By subtracting the data set with the receiver comb source off from the data set with the receiver comb source on, the spectral positioning of the receiver comb can be determined and compared to the data set when the receiver comb source is off, which reflects the spectral positioning of the transmitter frequency comb source. By varying the control setting for the receiver comb and retaking this measurement, the optimum initial setting can be quickly determined.

The method described in the previous paragraph can also be applied to get a first, coarse alignment of the frequencies of corresponding frequency comb components of the two combs. Indeed, the receiver WDM demultiplexer acts as a filter, so that the overall power recorded by the differential receivers or equivalently positioned optical monitors at the WDM demultiplexer output is maximized whenever the combs are well aligned with the WDM grid defined by the WDM receiver demultiplexer. Optimizing this alignment also allows reducing the frequency difference between corresponding components of the two combs. This results in a better initial state for starting an OPLLs or EPLLs locking two comb components, or locking an electrical oscillator to the beat frequency, since the requirements on the loop bandwidth of the PLLs will be relaxed.

Another method to find a good initial setting for the slave comb controls is to let one of the OPLLs converge at different convergence points, i.e. to lock one of the receiver comb components to one of the transmitter comb components, and to subsequently measure the difference between the free spectral range of the receiver comb from the free spectral range of the transmitter comb. If the transceiver comb and the receiver comb are generated by nominally identical devices, e.g. with comb lasers from the same batch or diced from the same laser bar, or with micro-resonators that are nominally identical, the free spectral range of the two combs should also be identical when their envelope functions are optimally aligned. Variations in environmental conditions and device fabrication will lead to finite free spectral range mismatch when the second OPLL is not activated, however the best overlap between the two envelope functions will also typically lead to the smallest free spectral range mismatch when the second OPLL is not activated. Thus, choosing an OPLL convergence point for the first OPLL that minimizes free spectral range mismatch also addresses the problem of achieving adequate overlap between the envelope functions.

The mismatch between the FSR of the two frequency comb sources can be measured with a simple procedure. In general, the difference of the beat frequencies (difference of the intermediate frequencies) obtained from interfering the receiver and transmitter combs recorded at two WDM demultiplexer ports separated by k nominal free spectral ranges will be k times the free spectral range mismatch. In the context of the previous paragraph this measurement can for example be repeated until the smallest FSR mismatch is achieved, i.e., until the beat frequency difference is the smallest possible. If one of the frequency comb components of the receiver is already known to be locked to one of the frequency comb components of the transmitter, the beat frequency recorded at a demultiplexer port located k nominal free spectral ranges from the locked component is directly k times the FSR mismatch, thus simplifying the procedure as a beat frequency difference does not need to be generated/calculated in the electrical domain.

In general, it is desirable for the WDM demultiplexer to have flattop transfer functions so that comb components fall in one of the demultiplexer output ports even when the OPLLs are not converged. This facilitates initial convergence of the OPLLs since a proper feedback signal can be more easily initially acquired with less complicated start-up procedures.

It can be desirable to choose the comb components used as feedback for the OPLLs to be at the extremes of the comb spectrum, i.e. with all the comb components actively used for data transmission in between these two components (these two components themselves can be used for data transmission or not, depending on the implementation). This can result in a more precise locking of the intermediate comb components, as the two extreme comb components are being locked. If the comb components used as feedback for the OPLLs are not modulated on the transceiver side in order to reduce the complexity of the OPLLs, this has the additional benefit that the comb components sacrificed for the OPLLs, i.e. that cannot be used for data transport, are on the extremes of the comb spectrum where power levels are lower. These power levels might be too low, or marginally low, for data transport, so that no data transport bandwidth is actually lost.

In one method, two OPLLs are used to lock two frequency components of the receiver optical comb, thus completely locking the receiver optical comb due to its mode-locked nature. In general, two OPLLs are sufficient to completely lock the receiver optical comb to the transmitter optical comb, by they do not necessarily need to lock two frequency components. Another mechanism is to use one OPLL to lock the frequency and phase of one comb frequency component and to use the second OPLL to directly lock the free spectral range $\Delta\omega$ and the phase offset between adjacent comb components, $\Delta\phi$. The phase offset mismatch between the two frequency combs and thus also the free spectral range mismatch between the two frequency combs can be measured by the previously described method, by electrically (including digitally) mixing the beat frequencies obtained at two different demultiplexer ports, thus obtaining the frequency difference of the two beat frequencies (and the phase difference of the two beat phases). With this method $\Delta\omega$ and $\Delta\phi$ can be measured and locked also independently of any given comb frequency already being locked.

In the previous descriptions, two OPLLs are used to lock the receiver optical comb to the transmitter optical comb. This can be challenging for some optical comb generating devices, since the FSR and the center frequency of one of the comb components have to be independently controllable. This is achieved by applying at least two control signals independently adjusted by the two OPLLs. In order to obtain independent control of the center frequency and of the free spectral range, the following matrix, where $cs_1$ and $cs_2$ are the two control signals $$\begin{bmatrix} \frac{\partial \omega_0}{\partial cs_1} & \frac{\partial \omega_0}{\partial cs_2} \\ \frac{\partial \Delta\omega}{\partial cs_1} & \frac{\partial \Delta\omega}{\partial cs_2} \end{bmatrix}$$

must have a rank 2, i.e. independent columns. The more independent the columns (the closer to orthogonal) the easier $\omega_0$ and $\Delta\omega$ can be controlled independently. In practice, the two control signals can have similar impact on $\omega_0$ and $\Delta\omega$ with the two columns of the matrix being close to collinear. This can, for example, be the case when laser drive current and laser temperature are used to tune a comb laser. Temperature and drive current changes might then have to be substantial in order reach the targeted $\omega_0$ and $\Delta\omega$, possibly resulting in decreased overall laser power (when the temperature is excessive) or shifted comb envelope functions, thus penalizing the system. A mechanism for tuning $\omega_0$ independently of $\Delta\omega$ such as an explicit phase tuning section in the laser is then of benefit. Another difficulty is that $\Delta\omega$ can be harder to tune than to since a small change in $\Delta\omega$ typically results in a large change in $\omega_0$. These are instances where $\Delta\omega$ is hard to control independently of $\omega_0$ and vice versa. In these cases, it is possible to use a combination of a single OPLL and a second compensation mechanism in the electrical domain such as an EPLL or feed forward carrier recovery, or to complement two imperfectly locking OPLLs with a compensation mechanism in the electrical domain.

One such possibility is to use an OPLL to lock one frequency component of the receiver comb to one frequency component of the transmitter comb (whose frequency component indices are referred to as 0) and to use electrical methods to compensate for the other degrees of freedom $\Delta\omega$ and $\Delta\phi$. A separate EPLL or feed forward carrier recovery can be implemented in the electric domain for each communications channel. However, due to the mode locked nature of the optical combs, this can be achieved with a single electrical or digital phase locked loop, whose generated frequency reference (the output of the EPLL serving as a reference for the intermediate frequency, i.e. the intermediate frequency reference) is used in all the other channels to demodulate the signals. One EPLL is applied to one of the other channels (index different from 0) whose corresponding transmitter and receiver comb components are not directly locked to one another with an OPLL. The index of this channel is referred to as m. Since the free spectral ranges of the two frequency combs are not locked to one another, there will be a finite beat frequency recorded and locked to by the EPLL at channel m. Due to the mode locked nature of the combs, the beat phase and beat frequency at all the other channels is expressed as a fraction of the beat phase and beat frequency of channel m. For channel n the beat frequency (intermediate frequency) $\omega_{IF,n}=\omega_{b,n}-\omega_{a,n}$ and the beat phase $\phi_{IF,n}=\phi_{b,n}-\phi_{a,n}$ are expressed as $\omega_{IF,n}=N/M\times\omega_{IF,m}$ and $\phi_{IF,n}=N/M\times\phi_{IF,m}$ where the subscripts IF, n, m, a, b refers to intermediate frequency, channel index n, channel index m, transmitter comb and receiver comb. All these can be generated from the signal generated by the EPLL and fed to the corresponding channel receivers after frequency multiplication or division by the corresponding fixed quotient. Fixed refers here to the fact that it is known by design and can be preset or preprogrammed in the hardware. It does not need to be dynamically adjusted during operation based on monitoring optical interferences between transmitter and receiver comb components or based on monitoring IF-carriers. By incorporating frequency dividers or frequency multipliers in the EPLL loop, the locked-to beat signal $\exp(i\times\omega_{IF,m}\times t+i\times\phi_{IF,m})$ can be directly up-converted or down-converted inside the EPLL depending on which reference signal is easier to generate the other frequency components from.

One benefit of this architecture is to reduce the amount of required circuitry, or the required computational capabilities of the circuitry. For example, if the EPLL is implemented in the form of an analog to digital converter (ADC) followed by a digital PLL, this subsystem needs only be implemented for one channel, the channel with index m. The intermediate frequency waveforms for all the other channels can be generated digitally from the reference signal and converted to the analog domain with digital to analog converters (DAC), creating channel specific intermediate frequency (IF) reference signals. This architecture is particularly attractive if the IF are relatively low speed compared to the data modulation, since only low speed ADCs, DACs and digital processing are then necessary. By sharing the digitally implemented EPLL between all the communications channels less ADCs and less digital processing bandwidth are required. The analog channel specific IF reference signals can be used in conjunction with mixers to demodulate the high-speed data signals that can then be sampled with high-speed receivers.

An alternative architecture is to sample the signals generated by the photodiodes with high speeds ADCs that are sufficiently fast to also recover the data patterns. Here too a single digital PLL is sufficient and the locked IF frequency and phase digitally adjusted for the other channels can be shared with the other channel demodulation algorithms that are then simplified from IF carrier recovery to simple demodulation based on a know IF signal.

If the intermediate frequencies are high, it might be beneficial to use an analog EPLL to recover a reference IF signal for channel m. This signal can then be converted to IF references for the other channels with analog circuitry.

Low IF frequencies are achievable in this architecture since they are a multiple of the $\Delta\omega$ mismatch once one of the comb frequency components has been locked (component of index 0). For typical micro-cavity OPOs and typical comb lasers, reproducibility of the FSR can be on the order of a few 10s of MHz even without active locking. The resulting intermediate frequencies in the few 10s of MHz range can be simply digitized, digitally analyzed and back-converted into the analog domain for analog high-speed processing. By using the frequency comb nature of the transmitter and receiver light sources, EPLL loop bandwidths (defined as the maximum IF-carrier frequency that can be locked) and ADC sampling rates generally do not need to exceed respectively 1 GHz and 1 Gsps (Giga-Sample per second). With high quality components in well controlled environmental conditions they can even be reduced to below 500 MHz, 200 MHz, 100 MHz or 50 MHz and respectively 500 Msps, 200 Msps, 100 Msps or 50 Msps depending on the quality of the optical comb sources and environmental control. By reducing loop bandwidths and sampling rates lower power consumption and lower hardware prices can be reached.

Instead of utilizing an EPLL, feed-forward carrier recovery can also be employed, for example as implemented with digital electronics after digitization of the photodetector signals with high-speed analog to digital converters. In this case the full algorithm only needs to be run on one channel, here also referenced to by the index m. For this channel, the underlying intermediate frequency (IF) and IF-phase due to frequency and phase mismatch between the corresponding frequency components of the receiver and transmitter frequency combs have to be digitally determined and normalized out. For the other channels, it is sufficient to convert the intermediate frequency and the determined IF-phase of the intermediate frequency reference of channel m into the corresponding values for the individual channels based on the previous formulas and to digitally demodulate them. Alternatively, as previously the channel specific IF references can also be converted back into the analog domain with DACs and used for analog demodulation (mixing). Since the first task (full feed-forward carrier recovery) is a computationally intensive task, since it can use computationally intensive algorithms such as maximum likelihood estimation, and since demodulation once the channel specific IF reference is known is much less computationally intensive, this greatly reduces the amount of digital logic that is required or the computational load on a DSP processor, allowing for cheaper and more compact implementation as well as lower electrical power consumption.

Another combination of OPLL with electrical compensation is to implement an OPLL that locks $\Delta\omega$ and $\Delta\phi$ of the receiver frequency comb to the corresponding values of the transmitter frequency comb. A single EPLL or feed-forward carrier recovery system determines the remaining frequency and phase mismatch between corresponding (same channel index) components of the two frequency combs. This frequency and phase mismatch is the same for all the channels due to the mode locked nature of the frequency combs, so that it has to be determined only once and the generated locked signal, i.e. the generated intermediate frequency reference (including digital data describing its phase and frequency), can be directly distributed to all the other channels.

It should be noted that when relying on a combination of an OPLL and an electronic compensation method, a 90 degree hybrid might be required even in the case of phase shift keying. If $\Delta\omega$ is large relative to the data rate, possibly by design by using mismatched frequency comb generating devices in the receiver and the transmitter, the resulting intermediate frequencies (beating frequencies) are fast relative to the data rate and the data can be recovered even from a simple balanced receiver. On the other hand, if the intermediate frequency is a low speed signal compared to the data rate, for example a signal up to a few tens of MHz compared to a Gbps data rate, a simple balanced receiver connected to a 2 by 2 mixer will periodically undergo time periods where the signal strength is minimal (down to zero) over several bits. If, as previously described, the signal recorded by the photodetectors is proportional to $a \times b \times \cos(\omega_a t - \omega_b t + \phi_a \pm \Delta\phi_a - \phi_b + \theta)$, the signal strength is zero whenever $\omega_a t - \omega_b t + \phi_a - \phi_b + \theta = 0$ or $\pi$. In this case a 90 degree hybrid is required even in case of phase shift keying, since with a 90 degree hybrid one of the complementary differential receivers always has finite signal strength (the complementary differential receiver has maximum signal strength when the first differential receiver has zero signal strength, and vice versa). The signals from the two complementary receivers can be added up using the reference signals generated by the EPLL or feed-forward carrier recovery method. For example, they can be individually demodulated by using two copies of the reference signal that are in quadrature to each other.

It should be noted that when a separate EPLL or feed-forward carrier recovery is implemented for each channel in combination with a single OPLL, instead of leveraging the mode-locked nature of the comb sources to reduce the number of EPLL or feed-forward carrier recovery to 1, the requirements on the OPLL can be greatly relaxed. In particular, the OPLL can then be replaced by an optical frequency locked loop, or by a simpler control system that simply ensures the frequency difference between the frequency components of the two combs are small enough to be tracked by the EPLLs or feed-forward carrier recovery systems. In this case the optical frequency combs also only need to be optical frequency combs in the loose sense, in that the phase offset of the combs does not need to be constant and the frequency offset of the combs does only need to be approximately constant. They can then also be referred to simply as multi-wavelength sources. The frequency offsets should be typically constant within a few 10s or few 100s of MHz, so that the ADC and DACs used in the electrical compensation schemes may remain relatively low speed.

The same methodology can be used with electrical compensation methods without an OPLL, with two elements that are one of an EPLL or a feed-forward demodulation technique. In this case electric domain demodulation processing is primarily applied to two channels (that are modulated or not modulated for system simplicity), referred to by indices 0 and m. The beating frequency and phase (intermediate frequency reference) is determined for channel 0 and the resulting wave or information sent forward to the demodulation processing at channel m. There, the combination of the incoming wave or information together with an EPLL (including in the digital domain) or feed-forward algorithm are used to extract the free spectral range mismatch and phase offset mismatch of the two frequency combs, or equivalently the intermediate frequency reference for channel m are determined (without needing the wave or information from channel 0). In both cases, all four parameters describing the mismatch between the two optical combs are determined. The combination of these two waves or two data sets is then sent to all the other channels where it can be straightforwardly combined to reconstruct the channel specific intermediate frequency reference for the corresponding channels. The other channels can then also be demodulated based on this wave or information. This greatly simplifies system complexity as only two PLL, two complete feed-forward carrier recovery algorithms or a combination of only two such elements is required. Here and elsewhere "complete feed-forward carrier recovery" refers to an algorithm or system that determines a frequency and phase independently from a monitored (and possibly digitized) beat signal, not based on an input from another channel.

A possible exemplary combination to demodulate the incoming channels electrically when the combs are shifted relative to each other with a larger frequency mismatch (i.e. the large frequency mismatch between receiver and transmitter comb components with the same index, but a small comb FSR mismatch) is to implement an analog EPLL that tracks the frequency mismatch between comb component with a single given index, referred to as 0, thus obtaining the intermediate frequency reference for channel 0, and to electrically mix all the other channels with the intermediate frequency reference of channel 0. The resulting down-converted signals are still not completely demodulated, but the residual intermediate frequency offset is an integer of the FSR mismatch between the two combs and has a much lower speed. A digital PLL or a digital feed-forward carrier recovery method to recover the residual intermediate frequency offset can be implemented for a channel of index m after digitizing this channel with a lower speed ADC. The resulting wave or information can be converted into the channel specific residual intermediate frequency offset for all the other channels. The final demodulation can be done digitally, if all the channels were digitized and ADCs fast enough to capture the data. Alternatively, the channel specific residual intermediate frequency offset references can be back-converted into the analog domain and mixed with an analog mixer to the down-converted channel signals in order to completely demodulate the data.

Here too, if a high-speed phase locked loop or feed forward carrier recovery system is applied to channel 0, for example in the form of an analog phase locked loop, and used to down convert all the other channels, but lower speed phase locked loops or feed forward carrier recovery systems are applied to all the other channels individually, for example in the form of ADCs and digital signal processing and possibly DACs, the mode locked comb sources can be replaced by multi-wavelength sources without constant phase offsets and only approximately constant frequency offsets, within a few 10s or a few 100s of MHz.

In this invention description, mode-locked frequency comb sources are a category of frequency comb sources, the latter also being referred to as frequency comb sources in the looser sense. The latter have a frequency offset between adjacent frequency components that is not necessarily exactly constant, but approximately constant, typically within a few 10s or a few 100s of MHz. In this context, the free spectral range of the frequency comb refers to the typical or average frequency spacing between adjacent comb components. In the context of locking with an OPLL, it refers to the frequency spacing between two specific comb components that are monitored by the OPLL. Frequency combs in the loose sense still refers to a device in which shifting the frequency of one comb component shifts the frequency of the other comb components by a similar amount, i.e. the sensitivity of the free spectral range on any given control signal is typically much smaller than the sensitivity of the spectral position of any given actively used comb component (this is due to the fact that the actively used comb components typically correspond to a high order resonance, so that changes in the FSR are reflected in a magnified way in the center frequency of individual comb components). This is for example the case for multi-frequency Fabry-Perot semiconductor lasers such as quantum dot lasers when they are not fully locked. This excludes for example arrays of independent single frequency lasers, such as in a classic WDM system, since their individual frequencies are essentially independently controllable.

In all preferred embodiments of the invention, a single OPLL, EPLL or feed-forward carrier recovery facilitates the demodulation of a large number of coherently detected optical channels in architectures that are uniquely enabled by the utilization of frequency comb sources. In one case an OPLL has an impact on all the channels since the loop controls a frequency comb source and has thus an impact on all the frequency comb components, locking them or at least significantly reducing the frequency of residual intermediate frequencies. In another case, an EPLL or feed-forward carrier recovery generates a reference signal that is utilized in the demodulation of a large number of channels. These architectures are uniquely enabled by frequency comb sources, since multi-frequency sources in which all the carrier frequencies are controlled completely independently from each other require an individual phase optical locked loop, electrical phase locked loop or feed-forward carrier recovery for each channel.

DETAILED DESCRIPTION OF EMBODIMENTS OF THE INVENTION

Figure 1:
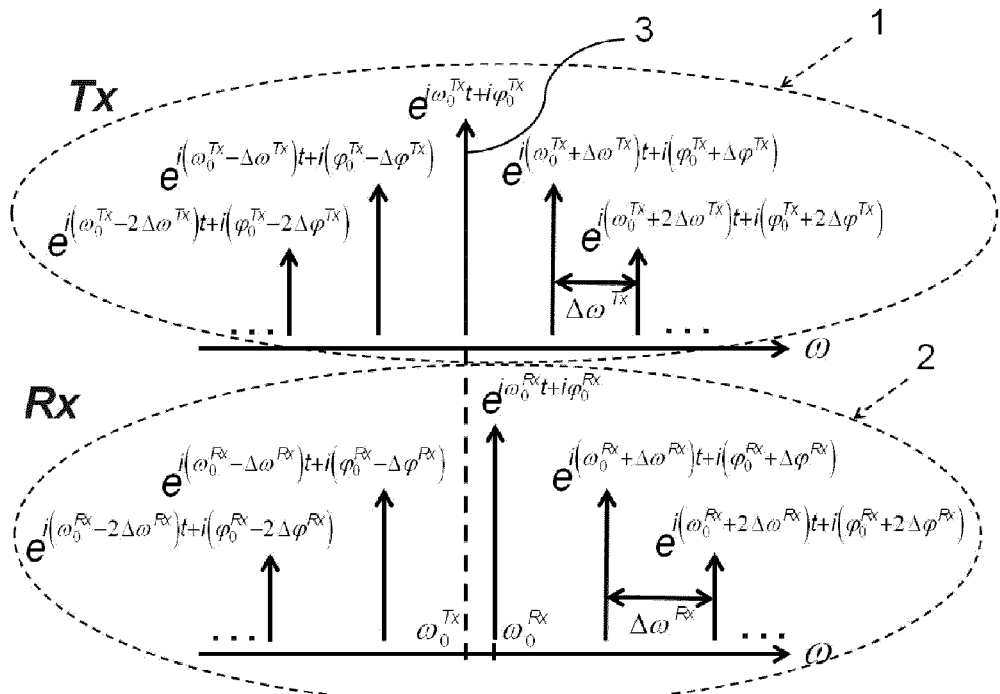
FIG. 1 shows transmitter and receiver mode-locked frequency combs and a mismatch thereof.

In FIG. 1, a transmitter Tx mode-locked frequency comb spectrum 1 and a receiver Rx mode-locked frequency comb spectrum 2 are shown. A frequency comb component 3 of the transmitter Tx frequency comb has a frequency $\omega_0^{Tx}$ and a phase $\phi_0^{Tx}$. The transmitter Tx comb has a free spectral range (also called frequency offset of the transmitter comb) $\Delta\omega^{Tx}$ and a phase offset $\Delta\phi^{Tx}$. Similar notation hold for the receiver Rx comb. The vertical axis represents the power level of the frequency comb components. The difference between the frequencies of the frequency comb components of index 0 of the two combs is illustrated.

Figure 2:
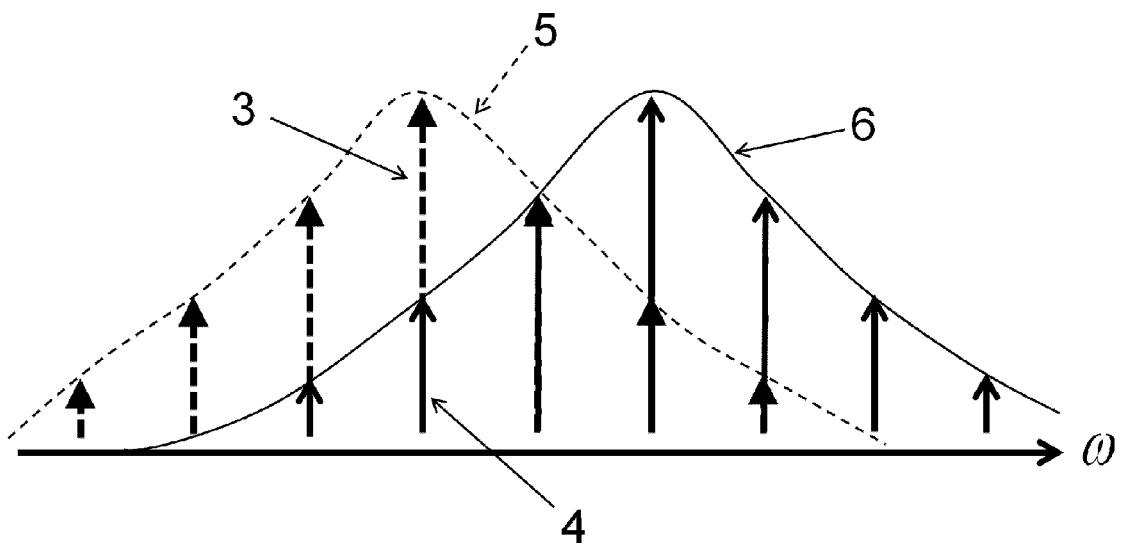
FIG. 2 shows transmitter and receiver frequency combs that are locked to one another with one or more OPLLs and envelope functions of the transmitter and receiver frequency combs.

In FIG. 2 the frequency comb components 3 of the transmitter Tx comb are represented with one type of arrow (dashed, filled arrow tip) and, frequency components 4 of the receiver Rx comb are represented with another type of arrow (continuous). As shown, the two combs are locked to each other, but the envelope functions 5 and 6 of the transmitter Tx and receiver Rx combs are shifted relative to each other.

Figure 3:
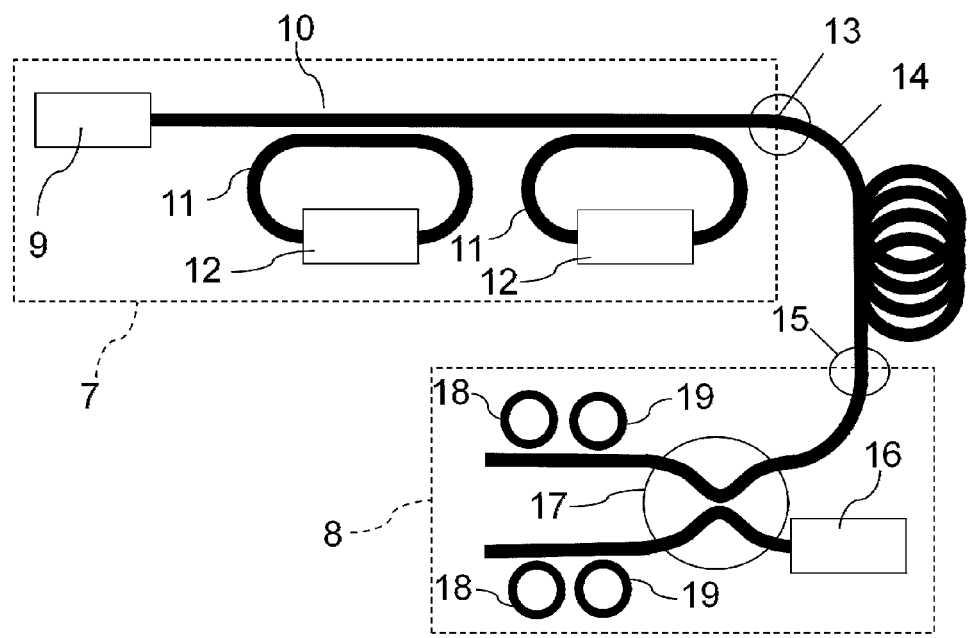
FIG. 3 shows a WDM coherent detection optical link with transmitter, transmitter optical comb source, receiver, receiver optical comb source, optical mixer and frequency selective photodetection, which is achieved with resonant photodetectors.

In FIG. 3, a schematic of a transmitter 7 and a receiver 8 are shown. A transmitter frequency comb source 9 is connected to a waveguide 10. The waveguide 10 is coupled to resonant modulators 11 that allow selective modulating of one of the frequency comb components of the transmitter frequency comb so that a WDM transmitter can be implemented. Here, the resonant modulators take the form of ring resonators with a high speed phase tuning section 12. In addition, to the high speed phase tuning section 12 these resonators 11 can also comprise low speed phase tuning sections or low speed refractive index tuning mechanisms (such as heating) that allow aligning a resonance of the resonant modulator 11 to one of the comb components of the transmitter frequency comb. These modulators 11 can modulate the phase of the frequency component, the amplitude of the frequency component, or a combination thereof. Other architectures, for example based on non-resonant modulators such as Mach-Zehnder modulators combined with frequency domain demultiplexers and multiplexers, can allow realizing a WDM transmitter based on an optical comb source.

Additionally, in FIG. 3, the transmitter optical output port 13 is connected to an optical fiber 14 and the other end of the optical fiber 14 is connected to the optical input port 15 of the WDM coherent receiver 8. Inside the receiver 8, a receiver optical comb source 16 is connected to an optical mixer 17.

The other input port of the mixer 17 receives the incoming light from the fiber 14. The output ports of the mixer 17 are connected to waveguides that are coupled to resonant photodetector pairs 18 and 19. The resonant photodetectors 18 both detect light from the same carrier frequency, while the photodetectors 19 both detect the light from another carrier frequency. This way, frequency selective photodetection can be achieved and all the relevant carrier frequencies read out from the mixer outputs. Photodetector pairs such as the pair 18 or the pair 19 are typically connected to balanced receivers. In a balanced receiver, the photocurrents from both photodetectors are read out and subtracted from each other. This allows removing the DC-offset resulting from the coherent detection scheme and to double the signal strength. Typically, substantially more than two channels, i.e. more than two resonant modulators and more than two photodetector pairs will be implemented. Only two are shown here for simplicity.

Figure 4:
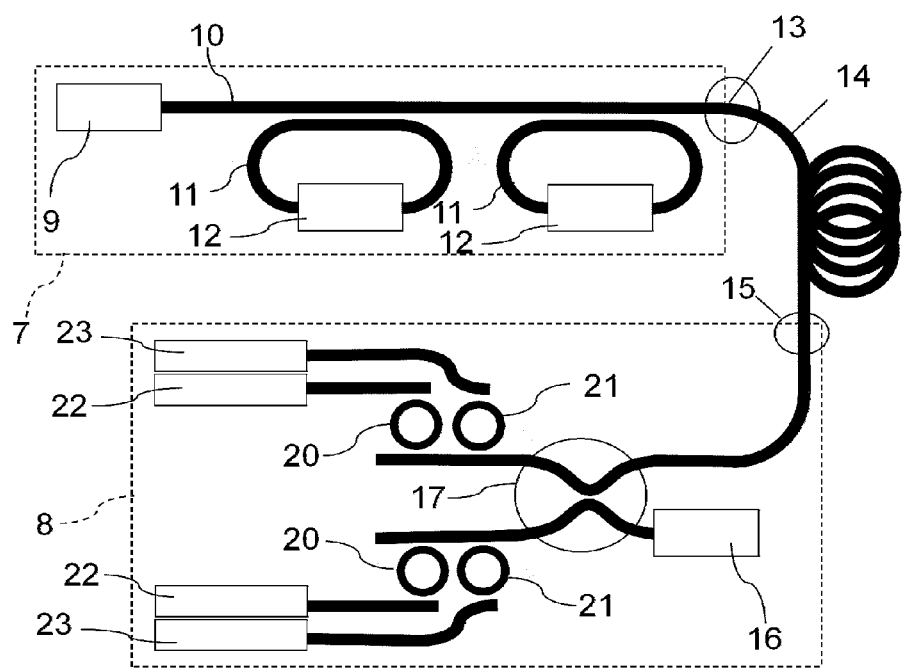
FIG. 4 shows a WDM coherent detection optical link with transmitter, transmitter optical comb source, receiver, receiver optical comb source, optical mixer and frequency selective photodetection, which is achieved with resonant add-drop multiplexers.

FIG. 4 similar to FIG. 3, illustrates a transmitter 7 and a receiver 8, with the difference from FIG. 3 being that the resonant photodetector pairs 18 and 19 of FIG. 3 are replaced by pairs of frequency-selective add-drop multiplexers 20 and 21 connected to non-resonant photodetector pairs 22 and 23. This configuration can be easier to implement than the configuration of FIG. 3 due to the fact that the ring-based resonant add drop multiplexers 20 and 21 will have higher quality factors and sharper resonances, due to the fact that they do not absorb light directly, and will thus have higher carrier frequency selectivity.

Figure 5:
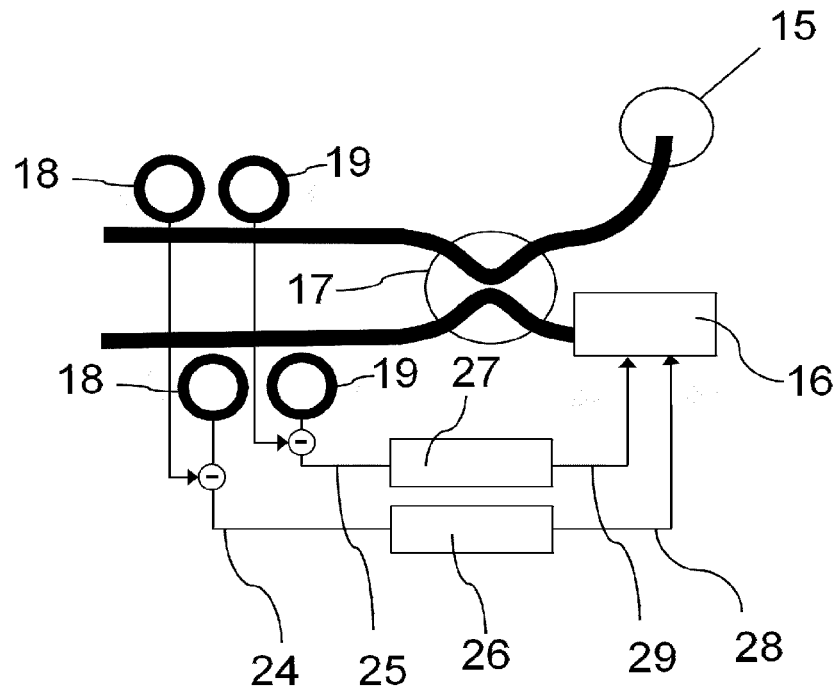
FIG. 5 shows a WDM coherent detection receiver with two OPLLs completely locking the phase and frequencies of the receiver optical comb components to the transmitter optical comb components.

FIG. 5 is a schematic of two OPLLs jointly locking all four parameters of a comb source by each locking a single frequency component. The photodetected signals from the pair of frequency matched photodetectors 18 are subtracted from each other, resulting in a signal 24 without DC offset. The same is done for photodetectors 19 that are tuned to a different comb frequency component, resulting in a signal 25 without DC offset. The signals 24 and 25 are converted into frequency comb control signals 28 and 29 by the drivers 26 and 27. These drivers 26 and 27 can, for example, control the temperature of the frequency comb source, the drive current of the frequency comb source or a phase tuning section inside the frequency comb source.

Figure 6:
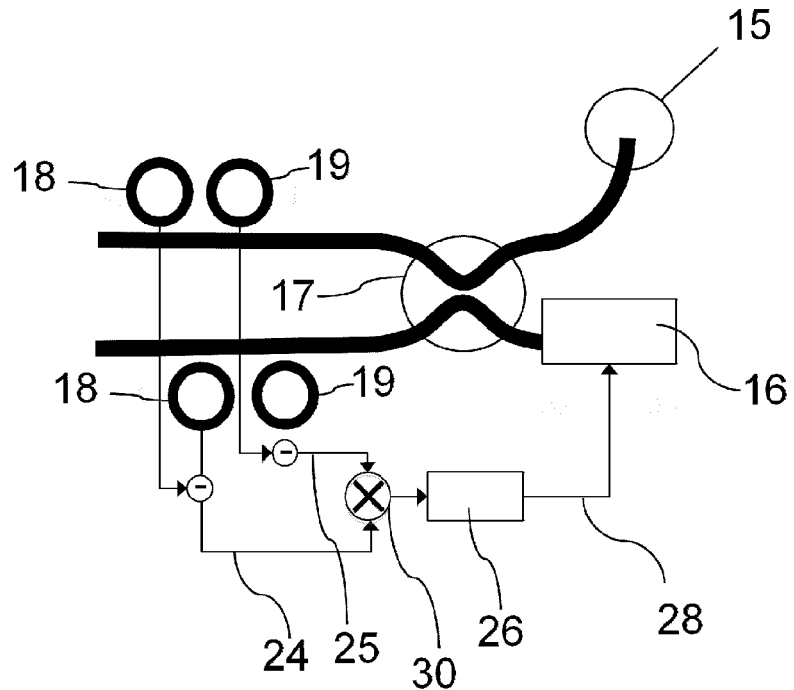
FIG. 6 shows a WDM coherent detection receiver where the free spectral range and the phase offset of the receiver optical comb is locked to the free spectral range and the phase offset of the transmitter optical comb with an OPLL.

FIG. 6 is a schematic of a single OPLL directly locking the free spectral range and the phase offset of a frequency comb source. The signals 24 and 25 generated from the photodetector pairs 18 and 19 are fed into a mixer 30. This mixer 30 generates a signal whose frequency and phase corresponds to the difference of the intermediate frequencies and of the intermediate frequency phases recorded by the two photodetector pairs 18 and 19. Since the OPLL zeros this frequency difference and phase difference, it effectively locks the FSR and phase offset of the slave frequency comb 16 to the corresponding values of the master frequency comb coupled into the system through input port 15.

Figure 7A:
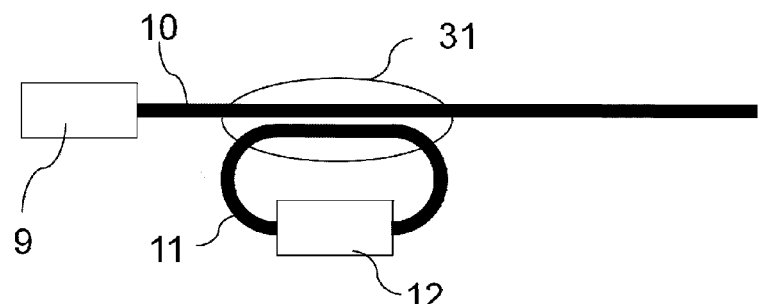
FIG. 7a shows a WDM transmitter with frequency comb source and resonant modulator.

In FIG. 7a, the phase tuning section 12 in a resonant modulator 11 is actuated according to an electric data stream and dynamically shifts back and forth the resonance of the resonant modulator in the spectral domain. This modifies the transfer function for the frequency comb components that have a center frequency close to the resonator resonance (i.e., to which the resonant modulator is tuned to). The transfer function refers to the transmitted amplitude and phase through the waveguide 10 from one side of the coupling region 31 to the other side of the coupling region 31. Detuning refers here to how much the resonance of the modulator is detuned relative to the center frequency of the modulated comb frequency component.

Figure 7B:
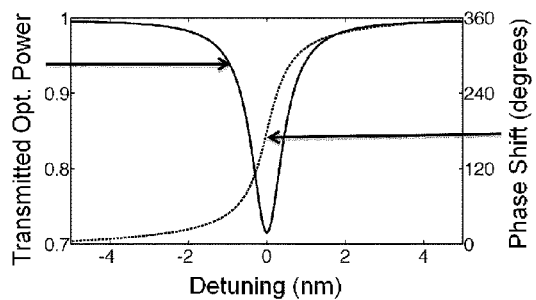
FIG. 7b shows a transfer function of a resonant modulator as a function of the detuning between a resonance of the resonant modulator and the carrier frequency of the modulated frequency comb component.
Figure 7C:
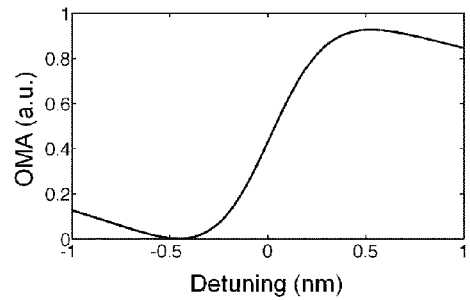
FIG. 7c shows an optical modulation amplitude obtained after demodulating in the receiver the optical signal generated by the modulator shown in FIGS. 7a and 7b.

In FIG. 7b, a graph shows the transmitted optical power (1 is 100%, 0 is 0%) as well as the phase shift applied to the modulated comb frequency component as a function of the detuning. The ring resonator here is highly overcoupled, that is, the coupling strength to the waveguide is much higher than the coupling strength required for critical coupling (complete light extinction at zero detuning) in order to optimize for phase modulation. In FIG. 7c, a graph shows the resulting optical modulation amplitude (OMA) after mixing in a receiver such as shown in FIG. 3. The result is normalized relative to the OMA obtained from phase modulation with an ideal phase modulator (π phase shift with no amplitude modulation), i.e. a transition between 0 and 1 on the Y-axis corresponds to ideal phase modulation. These curves were calculated assuming the unloaded quality factor of the resonant modulator to be 20000 and the loaded quality factor to be 1600.

Figure 8:
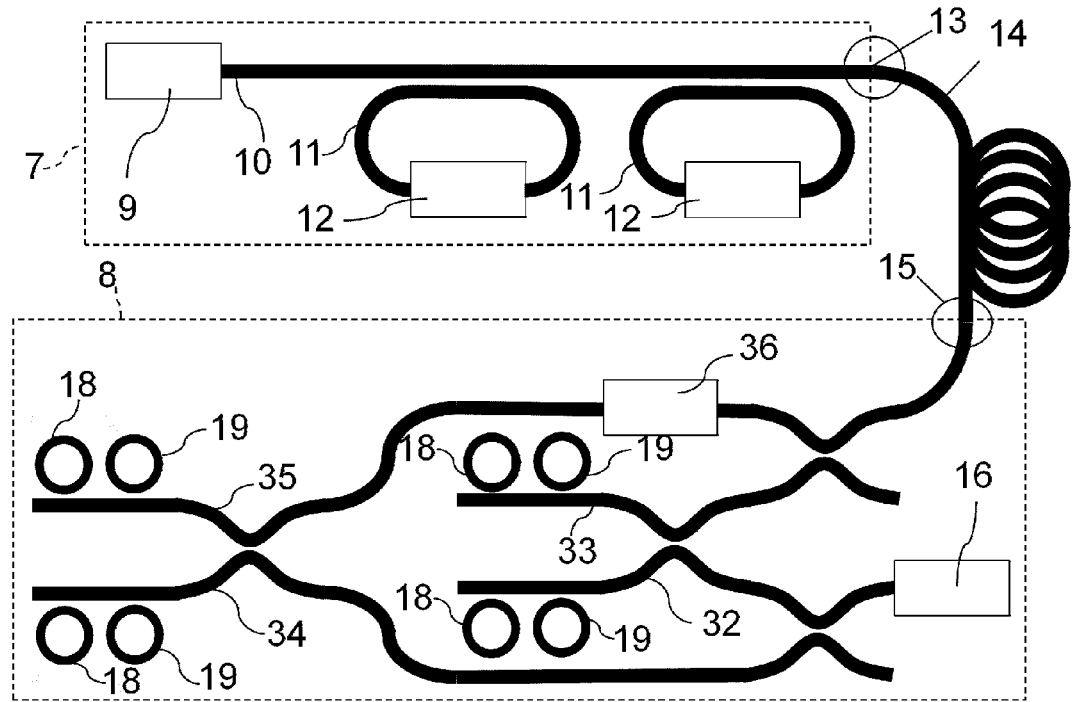
FIG. 8 shows a WDM coherent detection optical link with transmitter, transmitter optical comb source, receiver, receiver optical comb source, a 90 degree hybrid optical mixer and frequency selective photodetection.

In FIG. 8, a schematic of a receiver 8 comprising a 90 degree hybrid as a mixer is shown. A 90 degree hybrid is typically necessary, for example, when optical data is encoded with a QSFP signal or when heterodyne detection is applied to some channels, i.e., when a single OPLL or no OPLL is used. In order for signal 34 and signal 35 to be in quadrature relative to signal 32/33, a phase delay 36 is incorporated into the optical circuit. In theory, this phase delay 36 needs to have the value ±π/2 for the 90 degree hybrid to perform as expected. In order to compensate for temperature gradients or fabrication imperfections inside the 90 degree hybrid, the phase delay 36 can also be made adjustable such that the demodulated data signals are maximized.

Figure 9:
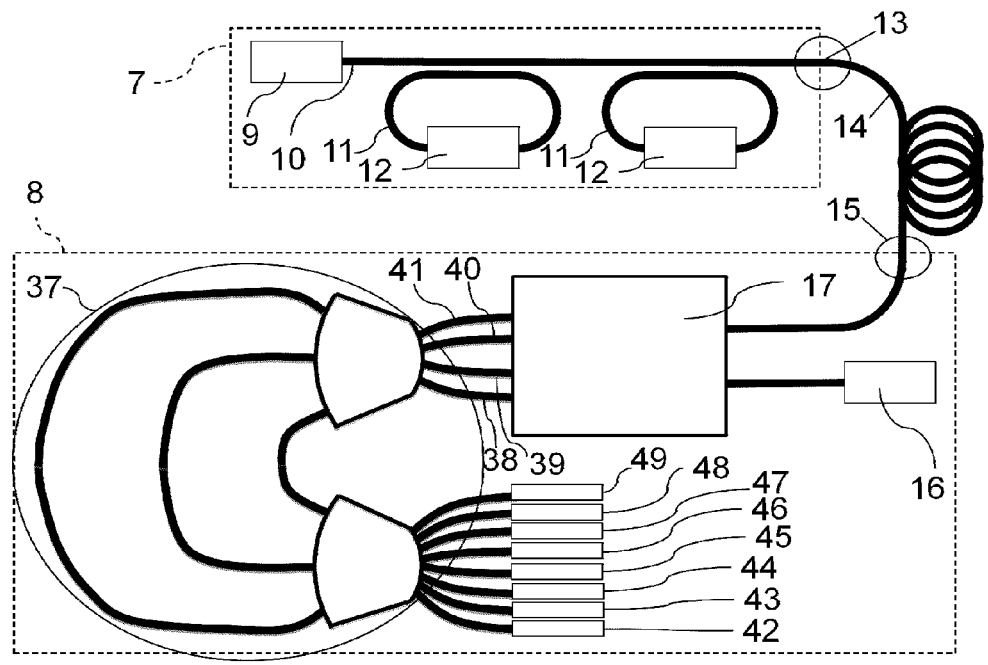
FIG. 9 shows a WDM coherent detection optical link with transmitter, transmitter optical comb source, receiver, receiver optical comb source, optical mixer and frequency selective photodetection, which is achieved with an AWG and non-resonant photodetectors.

In FIG. 9, a schematic of a receiver 8 where the output ports 38-41 of a mixer 17 are connected to a frequency domain demultiplexer 37 is shown. The demultiplexer 37 has several input ports connected to output ports of the mixer 17. The demultiplexer 37 also has a large number of output ports connected to photodetectors 42-49, typically at least the number of output ports of the mixer 17 times the number of actively modulated channels supported by the frequency comb. The demultiplexer 37 is implemented such that the individual output ports of the mixer 17 are routed to different subsets of the output ports of the demultiplexer 37 with sufficiently low cross-talk to maintain communication links. For example, if there are two demultiplexed comb components, there would be typically at least the 8 output ports connected to the photodetectors 42-49. For example, the photodetectors 42 and 46, 43 and 47, 44 and 48, 45 and 49 could form four such subsets corresponding to one of the mixer output ports (interleaved output ports). For example, photodetectors 42 and 43, 44 and 45, 46 and 47, 48 and 49 could form four such subsets corresponding to one of the mixer output ports (adjacent output ports). Here the demultiplexer 37 is an AWG with a subset of the arrayed waveguides drawn. The demultiplexer could also be an Echelle grating. The mixer 17 can be a 90 degree hybrid. It can also be a 2 by 2 mixer, in which case there would only be two mixer output ports.

Figure 10:
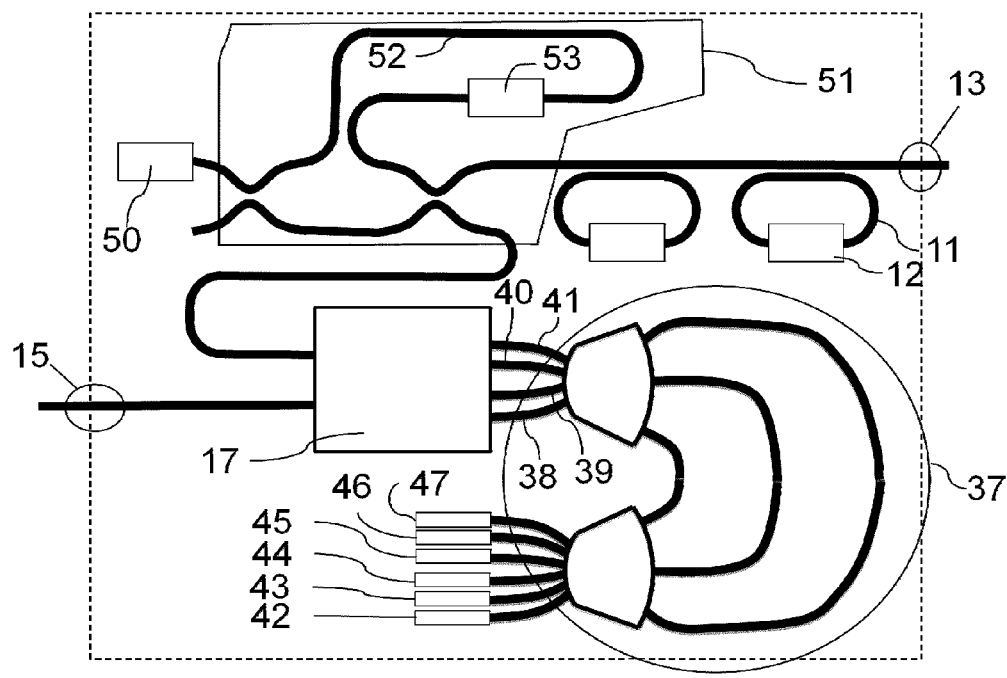
FIG. 10 shows a WDM coherent detection transceiver comprising a transmitter and a receiver in order to implement a fully duplex optical link where an interleaver is used to send a subset of the comb components of a frequency comb source to the transmitter and to send another subset of the comb components of the frequency comb source to the receiver.

FIG. 10 is a schematic of a transceiver comprising both a transmitter and a receiver, for example to implement a full duplex WDM link. A frequency comb source 50 is shared between the transmitter and the receiver. An interleaver 51 sends every second comb component to the receiver and every second comb component to the transmitter. The interleaver 51 is implemented in the form of an imbalanced Mach-Zehnder interferometer with a delay line 52. A phase tuning element 53 can serve to compensate for temperature drifts or fabrication tolerance. The phase tuning element 53 can also serve to determine which subset of the frequency comb is sent to the receiver and which subset of the frequency comb is sent to the transmitter. This can be important if the same optical chips are to be used for transceivers on both sides of the link, since the transmitter and receiver frequency comb subsets have to be swapped. This can be adjusted by the phase tuning element 53 as a function of the side of the link on which the transceiver is located. In order to further reconfigure the transceiver, a subset of the electrical receivers can be powered down, a subset of the modulators can be powered down, or the resonant photodetectors, resonant modulators, or resonant add-drops can be tuned accordingly.

Figure 11:
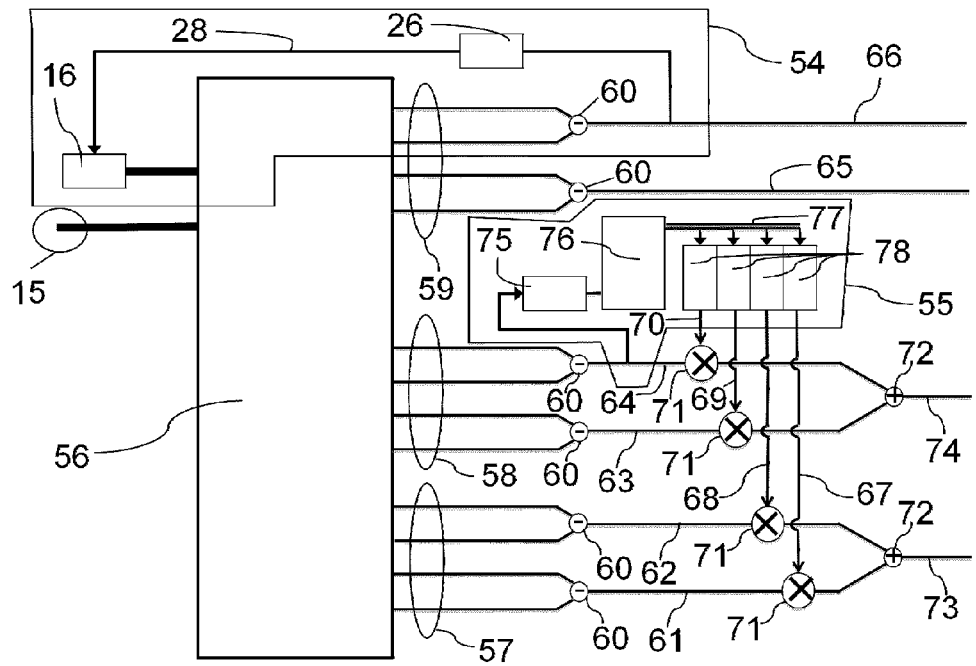
FIG. 11 shows a WDM coherent detection receiver with an OPLL and one of an EPLL or a feed-forward carrier recovery which generates intermediate frequency references for more than one channel where mixing between the channels and the generated intermediate frequency references is done in the analog domain.

FIG. 11 is a schematic of a receiver combining a single OPLL 54 with a single digital EPLL or feed-forward carrier recovery 55 in order to demodulate an entire WDM system. The input port 15 of the receiver and the receiver frequency comb source 16 are connected to an optical circuit 56 comprising a mixer and frequency selective photodetection. Here, the mixer is a 90 degree hybrid so that four photodetected signals are generated for each channel, which consists of three signal groups 57, 58 and 59. Each signal group 57, 58, 59 consists of two pairs of complementary signals, and the intermediate frequency carriers of the two pairs are in quadrature to each other as expected from a 90 degree hybrid. The complementary signal pairs are subtracted from each other by elements 60, thus cancelling their DC component and doubling the signal strength. This results in signals 61 to 66, where signals 61 and 62, which correspond to one channel are referred to as channel 1, signals 63 and 64, which correspond to another channel are referred to as channel 2, and signals 65 and 66, which correspond to yet another channel are referred to as channel 3. Channel 3 is monitored to close the OPLL feedback loop. Thus, the intermediate frequency corresponding to channel 3 is zeroed. Depending on which type of optical encoding is utilized, the data for channel 3 is read from one of the signals 65 or 66. For example, for phase shift keying, the data for channel 3 can be recovered from signal 66. For example, for amplitude shift keying, the data for channel 3 can be recorded from signal 65. For QSFP modulation, further decoding will be required from baseband signals 65 and 66 if data is applied to channel 3. Since there are 2 additional degrees of freedom of the receiver frequency comb that are not compensated by electronics, a further demodulation mechanism is required for the other channels. An EPLL or feed-forward carrier recovery circuit 55 monitors channel 2 by tapping the signal 64. The circuit 55 creates four intermediate references 67 to 70. 67 and 68 are the in phase and in quadrature intermediate reference signals for channel 1, 69 and 70 are the in phase an in quadrature intermediate reference signals for channel 2. For each channel, electric mixers 71 mix the channel specific intermediate frequency references with signals generated by elements 60, and elements 72 add the resulting signals. This results in demodulated data signals 73 and 74 for channels 1 and 2. The circuit 55 is implemented with digital electronics. An analog to digital converter 75 samples signal 64 and sends the data to a digital processing unit 76, such as an FPGA, a DSP, a microprocessor or an ASIC. Unit 76 implements a digital PLL or a feed-forward recovery procedure. Thus, the intermediate frequency reference for channel 2 is established. Based on the mode locked nature of the optical combs, the intermediate frequency references for other channels, such as channel 1, can be calculated. A data bus 77 sends the data to digital to analog converters 78 that generate the in phase and in quadrature channel specific intermediate frequency references used to demodulate the data signals 61 to 64. The intermediate frequency reference generated by the EPLL or feed forward carrier recovery 55 is routed to both the channels 1 and 2 in order to demodulate the data, to channel 2 directly and to channel 1 after being converted to the intermediate frequency reference of channel 1. Here routed refers to the fact that it enters a signal flow ending at the demodulator of channel 1.

Figure 12:
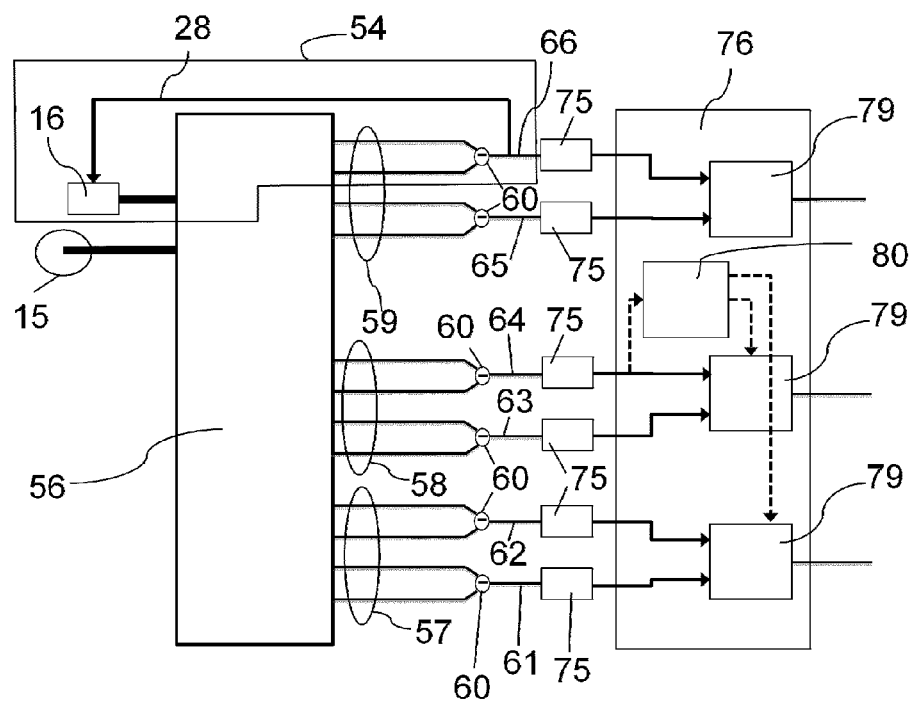
FIG. 12 shows a WDM coherent detection receiver with an OPLL and one of an EPLL or a feed-forward carrier recovery which generates intermediate frequency references for more than one channel where mixing between the channels and the generated intermediate frequency references is done in the digital domain.

In FIG. 12, similar to FIG. 11, the demodulation processing is done almost entirely in the digital domain. Analog to digital converters 75 sample signals 61 to 66. In this case the ADCs 75 have to sample fast enough to capture the data, i.e., they need to reach the Nyquist frequency (half the Baud rate) of the data stream, while this was not necessary in the architecture of FIG. 11. A digital processing unit 76 contains digital blocks or algorithms 79 that demodulate the data signals based on the digitized data. Arrows inside 76 indicate data buses between electronic blocks or data transfer between algorithms. A digital block or algorithm 80 implements a digital PLL or a feed-forward carrier recovery that recovers the intermediate frequency reference for channel 2. From this data, the intermediate frequency reference for other channels, such as channel 1, is also generated. The intermediate frequency reference generated by the EPLL or feed forward carrier recovery 80 is routed to both the channels 1 and 2 in order to demodulate the data, to channel 2 directly and to channel 1 after being converted to the intermediate frequency reference (or the corresponding data describing the intermediate frequency reference) of channel 1. Here routed refers to the fact that it enters a signal flow ending at the demodulator of channel 1.

Figure 13:
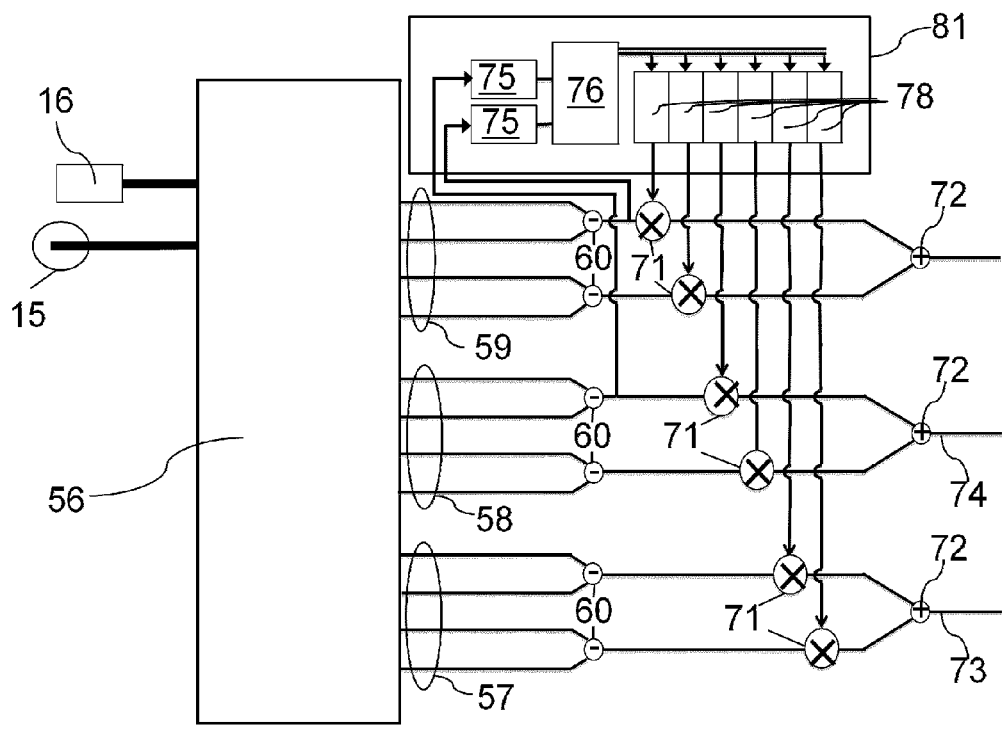
FIG. 13 shows a WDM coherent receiver with two EPLLs or feed-forward carrier recoveries, which generate intermediate frequency references for more than 2 channels and wherein the channels and the intermediate frequency references are mixed in the analog domain.

In FIG. 13, similar to FIG. 11, the OPLL has been replaced by a second EPLL or feed-forward carrier recovery. Two channels, channels 2 and 3, are monitored by a processing unit 81. The waveforms from the two channels are sufficient to recover all four degrees of freedom of the mismatch between the transmitter and the receiver optical combs. Thus, all the channel specific intermediate frequency references can be synthesized or generated. Here, the channel specific in-phase and in-quadrature intermediate frequency references are sent to mixers 71 in order to demodulate the data signals.

Figure 14:
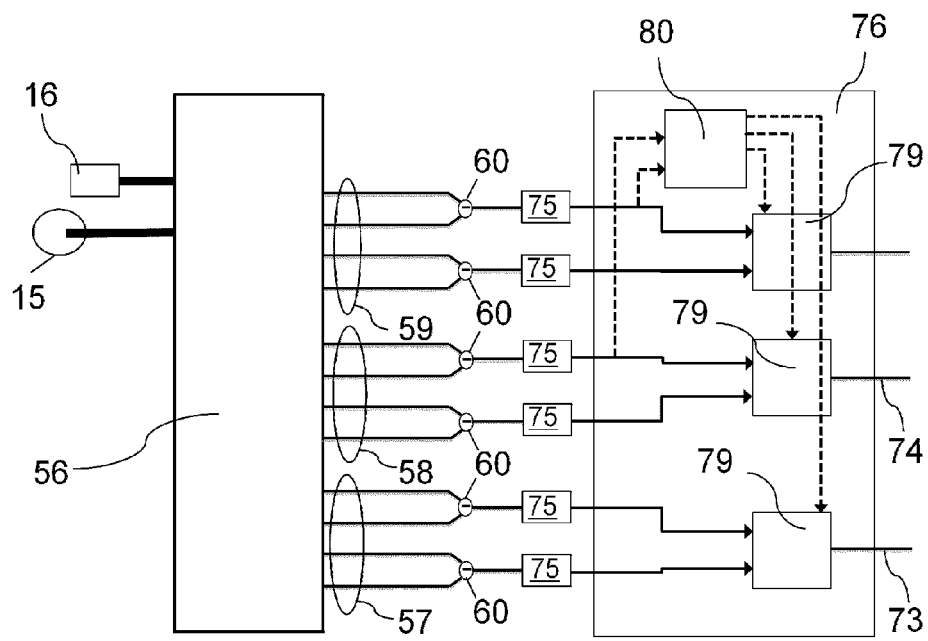
FIG. 14 shows a WDM coherent receiver with two of one of an EPLL or a feed-forward carrier recovery, wherein these generate intermediate frequency references for more than 2 channels and wherein the channels and the intermediate frequency references are mixed in the digital domain.

In FIG. 14, similar to FIG. 13, the demodulation processing is done almost entirely in the digital domain. The ADCs 75 have to be fast enough to sample the Nyquist frequency of the data pattern, while this was not necessary in FIG. 13. Digital blocks or algorithms 79 demodulate the channels. A digital block or algorithm 80 implements two of one of a digital PLL and a feed-forward carrier recovery in order to determine the 4 degrees of freedom of the mismatch between the transmitter and the receiver optical combs. The resulting data is used to demodulate the channels.

The optical data link comprises a transmitter 7 and a receiver 8 with coherent detection at the receiver 8 and more than one optical carrier frequency wherein the at least more than one optical carrier frequencies are generated by a frequency comb source in both the transmitter 7 and the receiver 8, wherein the frequency comb sources generate frequency combs that have frequency components and a free spectral range, wherein at least one frequency component or the free spectral range of the optical comb generated at the receiver 8 is locked to the comb generated at the transmitter 7 by an optical phase locked loop, and wherein the more than one optical carrier frequencies transport more than one optical channel. Preferably the frequency comb source at the transmitter 7 and the frequency comb source at the receiver 8 are mode-locked frequency comb sources, and wherein a second optical phase locked loop locks another of one frequency component or the free spectral range of the optical comb generated at the receiver 8 to the comb generated at the transmitter 7, such that all the frequency components of the mode-locked frequency comb generated at the receiver are locked to frequency components of the mode-locked frequency comb generated at the transmitter. Preferably the frequency comb source at the transmitter 7 and the frequency comb source at the receiver 8 are mode-locked frequency comb sources, wherein an electrical phase locked loop or feed-forward carrier recovery generates the intermediate frequency carrier for one optical channel, and wherein that intermediate frequency carrier is converted to the intermediate frequency carriers of other channels by multiplying its frequency and phase by a fixed quotient.

The invention claimed is:

1. An optical data link comprising a transmitter and a receiver with coherent detection at the receiver and a plurality of optical carrier frequencies,
   wherein the plurality of optical carrier frequencies are generated by a first optical comb source in the transmitter and a second optical comb source in the receiver,
   wherein the optical comb sources generate optical combs that have frequency components $\omega_m$ spaced by a frequency difference $\Delta\omega$,
   wherein the plurality of optical carrier frequencies transport a plurality of optical channels,
   wherein the carrier frequencies are independently modulated with separate data streams in the transmitter and thus form independent channels, and
   wherein at least one of
   (i) at least one of the frequency components $\omega_m$ or the frequency difference $\Delta\omega$ of the optical comb generated at the receiver is locked to the optical comb generated at the transmitter by an optical phase locked loop, or
   (ii) an electrical phase locked loop or a feed-forward carrier recovery generates an intermediate frequency carrier reference that is routed to more than one channel to demodulate the data from the data streams.

2. The apparatus of claim 1, wherein the electrical phase locked loop or the feed-forward carrier recovery is generating a first intermediate frequency carrier reference for a first optical channel.

3. The apparatus of claim 2, wherein the first optical comb source of the transmitter and the second optical comb source of the receiver are mode-locked frequency comb sources, wherein a second electrical phase locked loop or a second feed-forward carrier recovery generates a second intermediate frequency carrier reference for a second optical channel, and wherein the intermediate frequency carrier references for additional channels are generated by combining the first intermediate frequency carrier reference and the second intermediate frequency carrier reference.

4. The apparatus of claim 2, wherein additional electrical phase locked loops or feed-forward carrier recovery have a bandwidth or sampling rate that are respectively below 1 GHz or 1 Gsps.

5. The apparatus of claim 1, wherein the optical link is full duplex for at least a subset of optical channels, and wherein an optical comb source located on one side of the link is shared between a transmitter and a receiver on that side of the link, wherein another optical comb source located on the other side of the link is shared between a transmitter and a receiver located on said other side of the link.

6. The apparatus of claim 1, wherein the optical comb source at the receiver and the optical comb source at the transmitter are semiconductor comb lasers cleaved off from the same laser bar.

7. The apparatus of claim 1, wherein the receiver has an optical mixer with input and output ports, wherein a plurality of optical channels are coupled into one input port of the optical mixer, wherein more than one of the frequency components $\omega_m$ generated by the first optical comb source located at the receiver is coupled into another input port of said optical mixer and wherein the output ports of the optical mixer are connected to a frequency domain demultiplexer, to resonant add-drop multiplexers or to resonant photodiodes.

8. The apparatus of claim 1, wherein the transmitter comprises optical modulators implemented in the form of frequency-selective resonant modulators.

9. The apparatus of claim 1, wherein the receiver demodulates the data and then digitizes them by a thresholding circuit, wherein a subset of the frequency components $\omega_m$ of the optical comb generated at the transmitter are not modulated with a data stream and serve as frequency and phase reference for the optical phase locked loop at the receiver, and wherein a constant phase is applied to said non-modulated frequency components that ensures that the demodulated signal strengths of other optical channels are maximized in the receiver prior to the thresholding circuit.

10. The apparatus of claim 5, wherein an interleaver routes one subset of the frequency components $\omega_m$ of the optical frequency comb generated on one side of the link to the transmitter located on the same side of the link, wherein the interleaver routes another subset of the frequency components $\omega_m$ to a receiver located on the same side of the link, and wherein the subset that is routed to the receiver and the subset that is routed to the transmitter can be swapped by adjusting a phase tuning section within the interleaver.

11. The apparatus of claim 1, wherein at least one of the optical combs is an optical frequency comb wherein the phase difference $\Delta\phi$ between adjacent frequency components $\omega_m$ is substantially constant.

12. The apparatus of claim 1, wherein the first and second optical comb sources are one of optical resonators with parametric frequency comb generation or comb lasers.

13. The apparatus of claim 2, wherein the first optical comb source of the transmitter and the second optical comb source of the receiver are mode-locked frequency comb sources, wherein a second electrical phase locked loop or a second feed-forward carrier recovery generates a frequency difference $\Delta\omega_i$ and phase difference $\Delta\phi_i$ of the intermediate frequency carriers of optical channels with adjacent optical carrier frequencies to generate a second intermediate carrier reference, and wherein the intermediate frequency carrier references for additional channels are generated by combining the first intermediate carrier reference and the second intermediate carrier reference.

14. The apparatus of claim 12, wherein at least one of the frequency components $\omega_m$ of the optical comb generated at the receiver is locked to the optical comb generated at the transmitter by the optical phase locked loop, and wherein the optical comb sources in the receiver and in the transmitter are one of an optical resonator with parametric frequency comb generation or a comb laser.

15. The apparatus of claim 14, wherein the first optical comb source at the transmitter and the second optical comb source at the receiver are mode-locked frequency comb sources, and wherein a second optical phase locked loop locks another one of the frequency components $\omega_m$ or the frequency difference $\Delta\omega$ of the optical comb generated at the receiver to the optical comb generated at the transmitter, such that all the frequency components of the mode-locked frequency comb generated at the receiver are locked to the frequency components $\omega_m$ of mode-locked frequency comb generated at the transmitter.

16. The apparatus of claim 14, wherein the first optical comb source at the transmitter and the second optical comb source at the receiver are mode-locked frequency comb sources, wherein the electrical phase locked loop or the feed-forward carrier recovery generates the intermediate frequency carrier reference for one optical channel, and wherein that intermediate frequency carrier reference is converted to the intermediate frequency carrier references of other channels by multiplying its frequency and phase by a fixed quotient.

17. The apparatus of claim 16, wherein the electrical phase locked loop or the feed forward carrier recovery implemented to recover the intermediate frequency carrier references for optical channels have a loop bandwidth or digitization sampling rate that are below the Nyquist frequency of the data stream.

18. The apparatus of claim 16, wherein the electrical phase locked loop or the feed forward carrier recovery implemented to recover the intermediate frequency carrier references for optical channels have a loop bandwidth or digitization sampling rate that are respectively below 1 GHz or 1 Gsps.

* * * * *